(12) United States Patent
Ko et al.

(10) Patent No.: US 10,931,029 B2
(45) Date of Patent: Feb. 23, 2021

(54) DEVICE AND METHOD FOR ADJUSTING BEAM BY USING LENS IN WIRELESS COMMUNICATION SYSTEM

(71) Applicant: Samsung Electronics Co., Ltd., Suwon-si (KR)

(72) Inventors: Seungtae Ko, Suwon-si (KR); Yoongeon Kim, Suwon-si (KR); Hyunjin Kim, Suwon-si (KR); Junsig Kum, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/379,269

(22) Filed: Apr. 9, 2019

(65) Prior Publication Data
US 2019/0319363 A1  Oct. 17, 2019

(30) Foreign Application Priority Data

Apr. 11, 2018  (KR) .................. 10-2018-0042120

(51) Int. Cl.
*H01Q 21/00* (2006.01)
*H01Q 15/04* (2006.01)
*H04B 7/0426* (2017.01)

(52) U.S. Cl.
CPC ......... *H01Q 21/0031* (2013.01); *H01Q 15/04* (2013.01); *H04B 7/043* (2013.01)

(58) Field of Classification Search
CPC ........ H01Q 3/26; H01Q 21/065; H01Q 15/02; H01Q 21/00; H01Q 3/30–3/38; H01Q 15/04; H01Q 25/008; H04B 7/0617
See application file for complete search history.

(56) References Cited

U.S. PATENT DOCUMENTS 7,898,480 B2 * 3/2011 Ebling .................. H01Q 19/09
                                                    343/700 MS
10,116,061 B2 * 10/2018 Artemenko ............ H01Q 3/245
(Continued)

FOREIGN PATENT DOCUMENTS

JP       2003-163532 A       6/2003
KR       20170108365 A       9/2017
(Continued)

OTHER PUBLICATIONS

International Search Report with Written Opinion dated Jul. 17, 2019; International Appln. No. PCT/KR2019/004201.

*Primary Examiner* — Hasan Z Islam
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). The disclosure relates to a transmission device and method for adjustment of a signal beam by using a lens in wireless communication system, and includes a transmitter configured to form a beam by applying a predefined phase value pattern to a signal transmitted through an antenna array, the antenna array configured to emit the beam, and a lens having a phase mask corresponding to the phase value pattern, and configured to adjust a gain of the beam emitted from the antenna array. Accordingly, the transmission device and method can reduce a distance between an antenna and a lens in a wireless communication system.

18 Claims, 34 Drawing Sheets

(56) References Cited

U.S. PATENT DOCUMENTS

| | | |
|---|---|---|
| 2003/0011888 A1 | 1/2003 | Cox et al. |
| 2004/0189933 A1 | 9/2004 | Sun et al. |
| 2006/0202909 A1 | 9/2006 | Nagai |
| 2008/0238795 A1 | 10/2008 | Alamouti et al. |
| 2008/0272955 A1 | 11/2008 | Yonak et al. |
| 2010/0207833 A1 | 8/2010 | Toso et al. |
| 2014/0285373 A1* | 9/2014 | Kuwahara ............ H01Q 19/062 342/27 |
| 2014/0313090 A1 | 10/2014 | Oh et al. |
| 2015/0009080 A1 | 1/2015 | Oh et al. |
| 2015/0200452 A1 | 7/2015 | Oh et al. |
| 2016/0240923 A1* | 8/2016 | Oh ....................... H01Q 19/062 |
| 2017/0271762 A1 | 9/2017 | Ko et al. |
| 2017/0324171 A1* | 11/2017 | Shehan .................. H01Q 1/246 |

FOREIGN PATENT DOCUMENTS

| | | |
|---|---|---|
| KR | 20180096287 A | 8/2018 |
| KR | 20180096362 A | 8/2019 |

* cited by examiner

D = 5cm

D = 10cm

D = 20cm

D = 30cm

DEVICE AND METHOD FOR ADJUSTING BEAM BY USING LENS IN WIRELESS COMMUNICATION SYSTEM

CROSS-REFERENCE TO RELATED APPLICATION(S)

This application is based on and claims priority under 35 U.S.C. 119(a) of a Korean patent application number 10-2018-0042120, filed on Apr. 11, 2018, in the Korean Intellectual Property Office, the disclosure of which is incorporated by reference herein in its entirety.

BACKGROUND

1. Field

The disclosure relates to a wireless communication system. More particularly, the disclosure relates to a device and method for adjusting a beam by using a lens in a wireless communication system.

2. Description of the Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antennas, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

Further, in the 5G system, beamforming techniques may be used to overcome path loss. A variety of techniques may be used together to further enhance gain of a beam. For example, a gain amplifier using a lens may be considered. However, more efficient use of a lens is necessary in consideration of a space for lens installation, beam gain improvement by the lens, and the like.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a device and method for adjusting a beam by efficiently using a lens in a wireless communication system.

Another aspect of the disclosure is to provide a device and method for reducing a distance between an antenna and a lens in a wireless communication system.

Another aspect of the disclosure is to provide a device and method for increasing an area of a beam projected onto a lens in a wireless communication system.

Additional aspects will be set forth in part in the description which follows and, in part, will be apparent from the description, or may be learned by practice of the presented embodiments.

According to an embodiment of the disclosure, a transmission device in a wireless communication system is provided. The transmission device includes a transmitter configured to form a beam by applying a predefined phase value pattern to a signal transmitted through an antenna array, where the antenna array is configured to emit the beam, and a lens having a phase mask corresponding to the phase value pattern, and configured to adjust a gain of the beam emitted from the antenna array. Here, the phase value pattern may be defined to form a beam having a wide beam width compared to when the phase value pattern is not applied.

According to an embodiment of the disclosure, a method for operating a transmission device in a wireless communication system is provided. The method includes forming a beam by applying a predefined phase value pattern to a signal transmitted through an antenna array, and emitting the signal through a lens having a phase mask corresponding to the phase value pattern. Here, the phase value pattern may be defined to form a beam having a wide beam width compared to when the phase value pattern is not applied.

According to an embodiment of the disclosure, a device and method according to various embodiments can increase an effect of a lens by increasing an area in which a beam is projected onto a lens.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
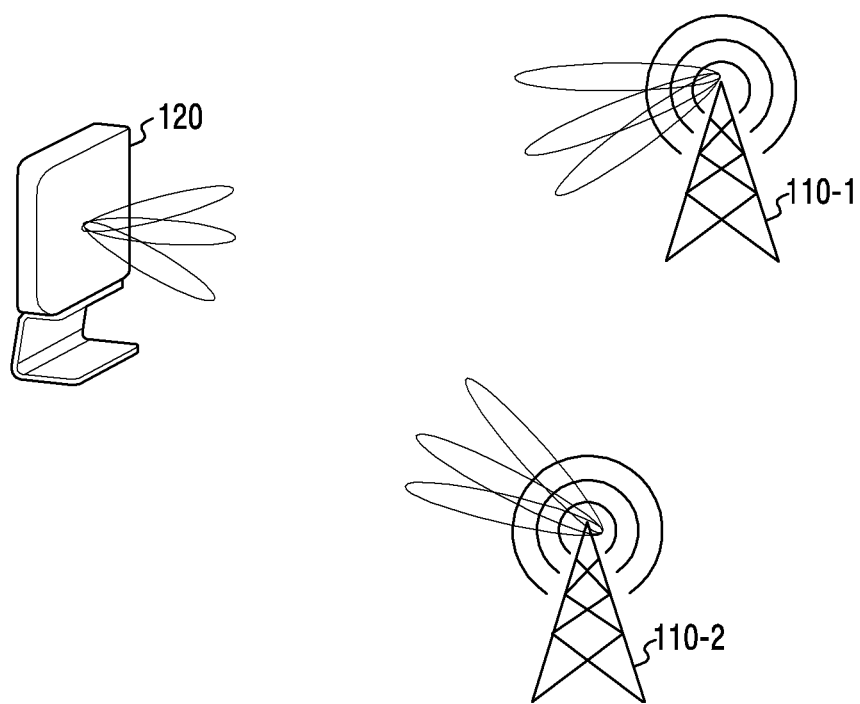
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in the context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings identical or similar to the contextual meanings in the relevant field of art, and are not to be interpreted to have ideal or excessively formal meanings unless clearly defined in the disclosure. In some cases, even a term defined in the disclosure should not be interpreted to exclude embodiments in the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a device and method for adjusting a beam by using a lens in wireless communication systems. Specifically, the disclosure describes a technique for reducing distances between an antenna and a lens and increasing an area of a beam projected on the lens in wireless communication systems.

Terms referring to a signal to be used, characteristics of a beam, network entities, an element of a device, and the like, are illustrated for convenience of explanation. Accordingly, the disclosure is not limited to the following terms and other terms having the same or similar technical meaning may be used.

FIG. 1 illustrates a wireless communication system according to an embodiment of the disclosure.

Referring to FIG. 1, a base station 110-1, a base station 110-2, and a terminal 120 are illustrated as nodes using a wireless channel in a wireless communication system. FIG. 1 illustrates two base stations, but may further include another base station that is the same as or similar to the base station 110-1 and the base station 110-2. FIG. 1 illustrates only one terminal, but may further include another terminal that is the same as or similar to the terminal 120.

The base station 110-1 and the base station 110-2 are network infrastructures that provide a wireless connection to the terminal 120. The base station 110-1 and the base station 110-2 have coverage defined as a particular geographic area on the basis of a distance in which a signal may be transmitted. Each of the base station 110-1 and the base station 110-2 may be referred to as, other than a base station, "an access point (AP)", "an eNodeB (eNB)", "a $5^{th}$ generation node (5G node)", "$5^{th}$ generation nodeB (gNB)", "a wireless point", a "transmission/reception point (TRP)", or other terms having equivalent technical meanings.

The terminal 120 is a device used by a user, and performs communication with the base station 110-1 and the base station 110-2 via a wireless channel. The terminal 120 may be a device having mobility or a fixed device. In some cases, the terminal 120 may be operated without user involvement. For example, the terminal 120 is a device that performs machine type communication (MTC), and may not be carried by a user. The terminal 120 may be referred to as, other than a terminal, "a user equipment (UE)", "a mobile station", "a subscriber station", "a remote terminal", "a wireless terminal", "a user device", "a customer premise equipment" or other terms having equivalent technical meanings.

The base station 110-1, the base station 110-2, and the terminal 120 may transmit and receive wireless signals in a millimeter wave band (e.g., 28 GHz, 30 GHz, 38 GHz, and 60 GHz). At this time, in order to improve channel gain, the base station 110-1, the base station 110-2, and the terminal 120 may perform beamforming. The beamforming may include transmission beamforming and reception beamforming. That is, the base station 110-1, the base station 110-2, and the terminal 120 may assign directivity to a transmission signal or a reception signal. To this end, the base station 110-1, the base station 110-2, and the terminal 120 may select serving beams via a beam search procedure or a beam management procedure. After the serving beams are selected, communication may then be performed via resources that are in a quasi-co-located (QCL) relationship with resources at which the serving beams are transmitted.

If it is possible to infer large-scale characteristics of a channel for transferring of a symbol on a first antenna port, from a channel for transferring of a symbol on a second antenna port, then it may be estimated that the first antenna port and the second antenna port are in a QCL relationship. For example, the large-scale characteristics may include at least one among a delay spread, a Doppler spread, a Doppler shift, an average gain, an average delay, and a spatial receiver parameter.

Figure 2:
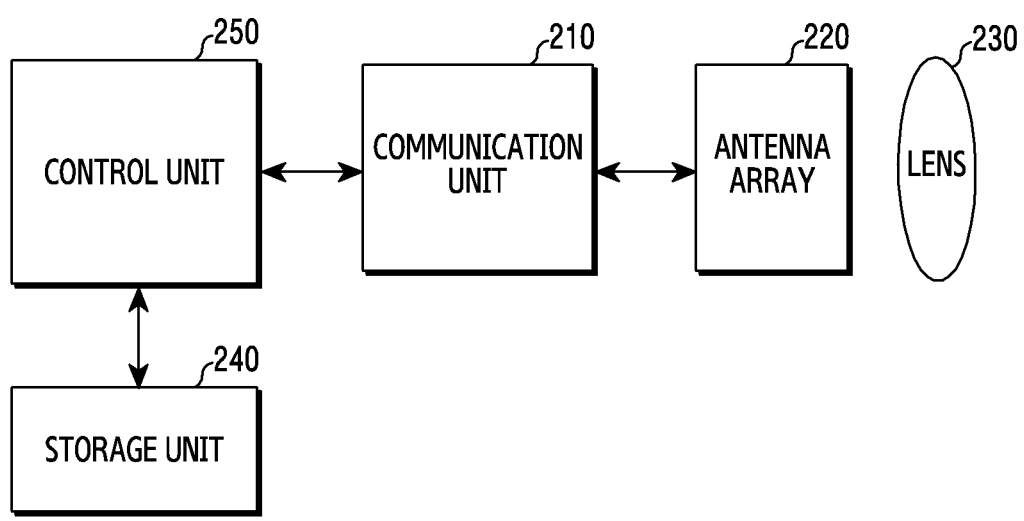
FIG. 2 illustrates a configuration of a terminal in a wireless communication system according to an embodiment of the disclosure.

FIG. 2 illustrates a configuration of a terminal in a wireless communication system according to an embodiment of the disclosure. The configuration illustrated in FIG. 2 may be understood as a configuration of the terminal 120. The term "-unit" or "-er" used hereinafter may refer to a unit for processing at least one function or operation and may be implemented in hardware, software, or a combination of hardware and software.

Referring to FIG. 2, a terminal includes an antenna array 220, a communication unit 210, a lens 230, a storage unit 240, and a control unit 250.

The communication unit 210 performs functions for transmitting or receiving a signal through a wireless channel. For example, the communication unit 210 performs a function of conversion between a baseband signal and a bit stream according to a physical layer standard of a system. For example, when data is transmitted, the communication unit 210 generates complex symbols by encoding and modulating a transmission bit stream. Also, when data is received, the communication unit 210 restores a reception bit stream by demodulating and decoding a baseband signal. Also, the wireless communication unit 210 up-converts a baseband signal into a radio frequency (RF) band signal and transmits the same through an antenna, and down-converts an RF band signal received through an antenna into a baseband signal. For example, the wireless communication unit 210 may include a transmission filter, a reception filter, an amplifier, a mixer, an oscillator, a digital to analog converter (DAC), an analog to digital converter (ADC), and the like.

Further, the communication unit 210 may include a plurality of transmission/reception paths. In terms of hardware, the communication unit 210 may include a digital circuit and an analog circuit (e.g., a RF integrated circuit (RFIC)). The digital circuit and the analog circuit may be implemented in a single package. The communication unit 210 may also include a plurality of RF chains. Further, the communication unit 210 may perform beamforming.

The communication unit 210 transmits and receives a signal as described above. Accordingly, all or a part of the communication unit 210 may be referred to as "a transmitter", "a receiver", or "a transceiver". Also, transmission and reception performed through a wireless channel, which will be described in the following descriptions, may be understood to mean that the above-described processing is performed by the communication unit 210.

The antenna array 220 emits a signal generated by the communication unit 210 or detects a signal received from the outside. The antenna array 220 includes a plurality of antenna elements. Based on phase values of signals transmitted through the plurality of antenna elements, the directivity of a signal is assigned, and beam width may be adjusted.

The lens 230 is an element for adjusting a gain of a signal emitted from the antenna array 220 or a gain of a signal received from the outside. The lens 230 may be a passive element the gain of which is adjusted as a signal passes therethrough. The lens 230 may include a plurality of unit cells. Specifically, the lens 230 may include a plurality of unit cells, wherein each of the plurality of unit cells has a unique dielectric rate and a unique shape. Here, the dielectric rate of each unit cell may be determined according to a type of material (e.g., a dielectric) that constitutes a unit cell, and a shape and size of the material (e.g., a conductor) included in the unit cell. In view of an equivalent circuit, each unit cell may be interpreted as a circuit including at least one capacitor or at least one inductor. According to various embodiments, the lens 230 may include a plurality of layers. The lens 230 may have a variety of shapes. For example, the lens 230 may be planar, a circular plane, or a divided circular plane. As another example, the lens 230 may be in the form of a rectangle or an octagon.

The storage unit 240 may store data, such as a basic program for operation of a terminal, an application program, configuration information, and the like. The storage unit 240 may include a volatile memory, a non-volatile memory, or a combination of a volatile memory and a non-volatile memory. The storage unit 240 provides stored data in response to a request of the control unit 250.

The control unit 250 controls overall operations of the terminal. For example, the control unit 250 transmits and receives a signal via the communication unit 210. Further, the control unit 250 records data in the storage unit 240 and reads the recorded data. The control unit 250 may perform functions of a protocol stack required by the communication standard. To this end, the control unit 250 may include at least one processor or a micro-processor, or may be a part of a processor. A part of the communication unit 210 and the control unit 250 may be referred to as a communication processor (CP).

According to various embodiments, the control unit 250 may control the communication unit 210 to perform beamforming by applying a phase value pattern that is defined to form a wide beam. Here, the wide beam refers to a beam having a wide beam width relative to a beam to which the phase value pattern is not applied. For example, the control unit 250 may control the terminal to perform operations according to various embodiments described below.

Figure 3A:
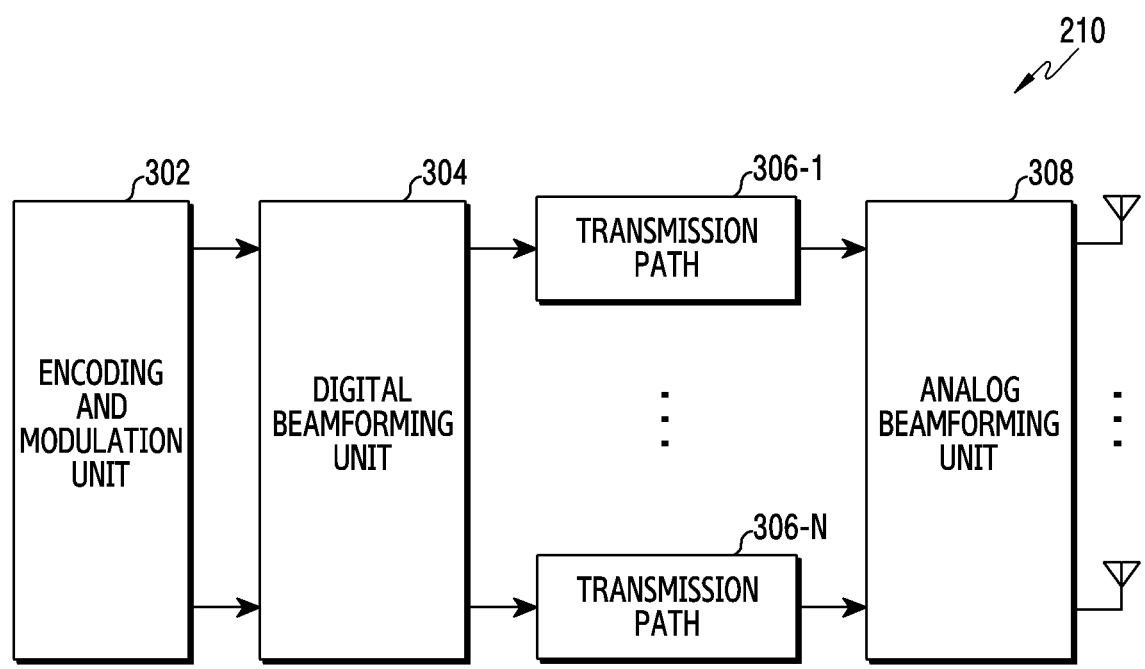
FIG. 3A illustrates a block diagram of a configuration of a communication system in a wireless communication system according to an embodiment of the disclosure.
Figure 3B:
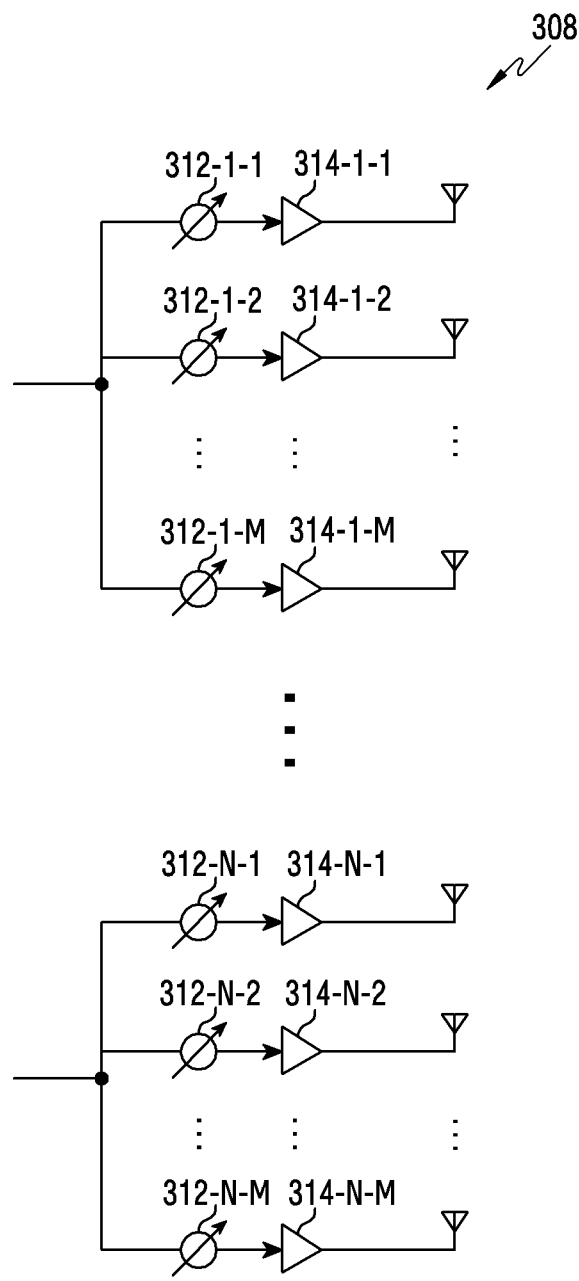
FIGS. 3B and 3C illustrate configurations of communication systems in a wireless communication system according to embodiments of the disclosure.
Figure 3C:
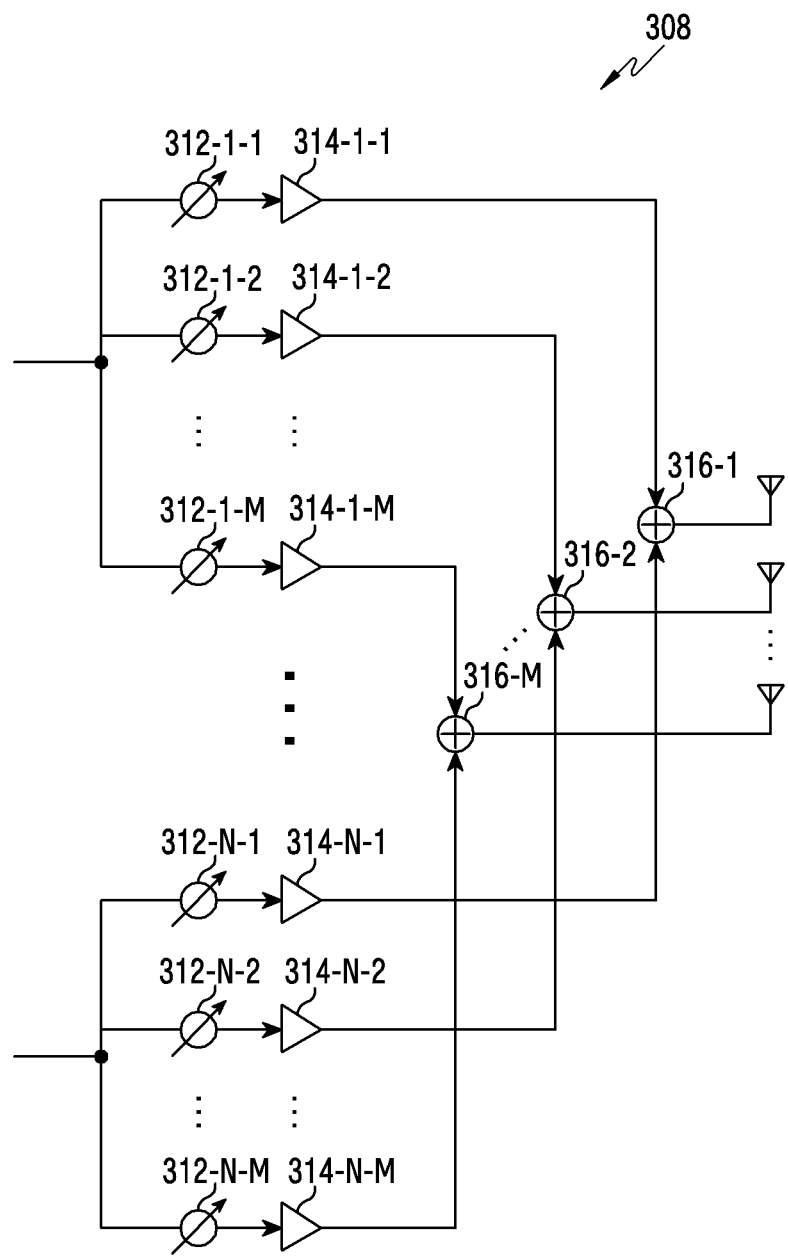

FIG. 3A illustrates a block diagram of a configuration of a communication system in a wireless communication system according to an embodiment of the disclosure. FIGS. 3B and 3C illustrate configurations of communication systems in a wireless communication system according to embodiments of the disclosure.

FIG. 3A illustrates an example of detailed configurations of the communication unit 210 of FIG. 2, and FIGS. 3B and 3C illustrate examples of detailed configurations of the communication unit 210 of FIG. 2. Specifically, FIG. 3A illustrates an example of elements, as a part of the communication unit 210 of FIG. 2, for performing beamforming, and FIGS. 3B and 3C illustrate examples of elements, as a part of the communication unit 210 of FIG. 2, for performing beamforming.

Referring to FIG. 3A, the communication unit 210 includes an encoding and modulation unit 302, a digital beamforming unit 304, a plurality of transmission paths 306-1 to 306-N, and an analog beamforming unit 308.

The encoding and modulation unit 302 performs channel encoding. For channel encoding, at least one among a low density parity check (LDPC) code, a convolution code, and a polar code may be used. The encoding and modulation unit 302 also generates modulation symbols by performing constellation mapping.

The digital beamforming unit 304 performs beamforming on a digital signal (e.g., modulation symbols). To this end, the digital beamforming unit 304 multiplies modulation symbols by beamforming weights. Here, the beamforming weights are used to change a magnitude and phase of a signal, and may be referred to as "a precoding matrix", "a precoder", or the like. The digital beamforming unit 304 may output digital-beamformed modulation symbols to the plurality of transmission paths 306-1 to 306-N. According to a multiple-input multiple-output (MIMO) transmission technique, the modulation symbols may be multiplexed or the same modulation symbols may be provided to the plurality of transmission paths 306-1 to 306-N.

The plurality of transmission paths 306-1 to 306-N convert digital beamformed-signals into analog-signals. To this end, each of the plurality of transmission paths 306-1 to 306-N may include an inverse fast Fourier transform (IFFT) calculation unit, a cyclic prefix (CP) insertion unit, a DAC, and/or an up-conversion unit. The CP insertion unit is for an orthogonal frequency division multiplexing (OFDM) scheme, and may be excluded when another physical layer scheme (e.g., a filter bank multi-carrier (FBMC)) is applied. That is, the plurality of transmission paths 306-1 to 306-N provide independent signal processing processes to a plurality of streams generated via digital beamforming. However, depending on implementation, some elements of the plurality of transmission paths 306-1 to 306-N may be used in common or otherwise shared.

The analog beamforming unit 308 performs beamforming on an analog signal. To this end, the digital beamforming unit 304 multiplies analog signals by beamforming weights. The beamforming weights are used to change a magnitude and a phase of a signal. Specifically, according to a connection structure between the plurality of transmission paths 306-1 to 306-N and antennas, the analog beamforming unit 308 may be configured as shown in FIG. 3B or 3C.

Referring to FIG. 3B, signals input to the analog beamforming unit 308 are transmitted through the antennas via phase/magnitude conversion and amplification calculation. At this time, signals of respective paths are transmitted through different antenna sets, i.e., antenna arrays. Referring to processing of signals input through a first path, the signals are converted into signal sequences having different phases/magnitudes or the same phase/magnitude by phase/magnitude conversion units 312-1-1 to 312-1-M, amplified by the amplifiers 314-1-1 to 314-1-M, and then transmitted through the antennas.

Referring to FIG. 3C, signals input to the analog beamforming unit 308 are transmitted through the antennas via phase/magnitude conversion and amplification calculation. At this time, signals of respective paths are transmitted through the same antenna set, i.e., an antenna array. Referring to processing of signals input through the first path, the signals are converted into signal sequences having different phases/magnitudes or the same phase/magnitude by the phase/magnitude conversion units 312-1-1 to 312-1-M, and amplified by the amplifiers 314-1-1 to 314-1-M. For transmission through a single antenna array, the amplified signals are combined by combination units 316-1-1 to 316-1-M on the basis of antenna elements, and then transmitted through the antennas.

Phase/magnitude values converted by the phase/magnitude conversion units 312-1-1 to 312-1-M illustrated in FIGS. 3B and 3C may include phase/magnitude values for adjusting the directivity of beams and phase/magnitude values for adjusting beam widths (i.e., a multi-beam). The beam widths may be adjusted to control beam gains, for example, adjusted based on a channel, or may be adjusted to increase a gain improvement effect by a lens. According to an embodiment, in order to increase the gain improvement effect by the lens, the phase/magnitude values for adjusting beam widths may be used as reference phase/magnitude values of the phase/magnitude conversion units 312-1-1 to 312-1-M, in other words, default configuration values of the phase/magnitude conversion units 312-1-1 to 312-1-M.

FIG. 3B shows an example in which an independent antenna array specific to each transmission path (units 312-1-1 to 312-1-M and amplifiers 314-1-1 to 314-1-M; units 312-N-1 to 312-N-M and amplifiers 314-N-1 to 314-N-M) is used, and FIG. 3C shows an example in which transmission paths (units 312-1-1 to 312-1-M and amplifiers 314-1-1 to 314-1-M; units 312-N-1 to 312-N-M and amplifiers 314-N-1 to 314-N-M) share one antenna array. However, according to another embodiment, some transmission paths may use an independent array, and the remaining paths may share one antenna array. Further, according to still another embodiment, a structure adaptively changeable depending on a situation may be used by applying a structure switchable between transmission paths and antenna arrays.

According to the configuration of a terminal (e.g., the terminal 120) described by referring to FIGS. 2, 3A and 3C, the terminal may improve, by using a lens, a gain of a signal emitted from an antenna array, or a gain of a signal received in the antenna array. Similarly, a base station (e.g., the base station 110-1 or the base station 110-2) may also have at least one lens. Further, according to various embodiments, the base station may include a lens having a structure to be described hereinafter. Therefore, embodiments related to the lens will be described with reference to a terminal for convenience of explanation. However, various embodiments to be described hereinafter may be applied to a base station.

A gain of a signal may be improved by using a lens (e.g., the lens 230). The lens may increase a gain of an antenna by changing, to the in-phase, a phase profile of an electromagnetic (EM) wave in a space. Hereinafter, the principle of gain increase by a lens will be described using FIGS. 4A, 4B and 4C.

Figure 4A:
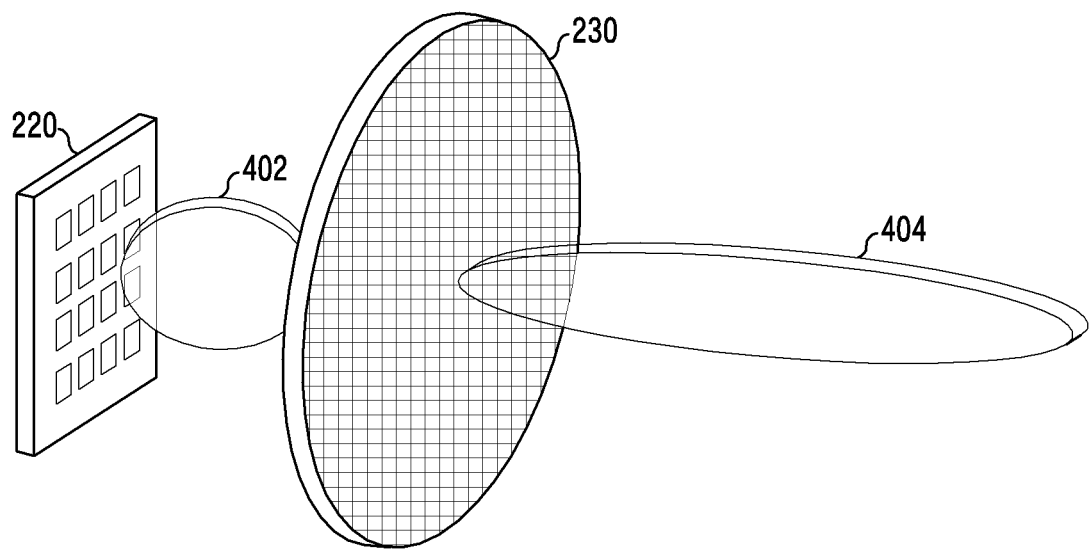
FIG. 4A illustrates improvement of a beam gain through a lens in a wireless communication system according to an embodiment of the disclosure.
Figure 4B:
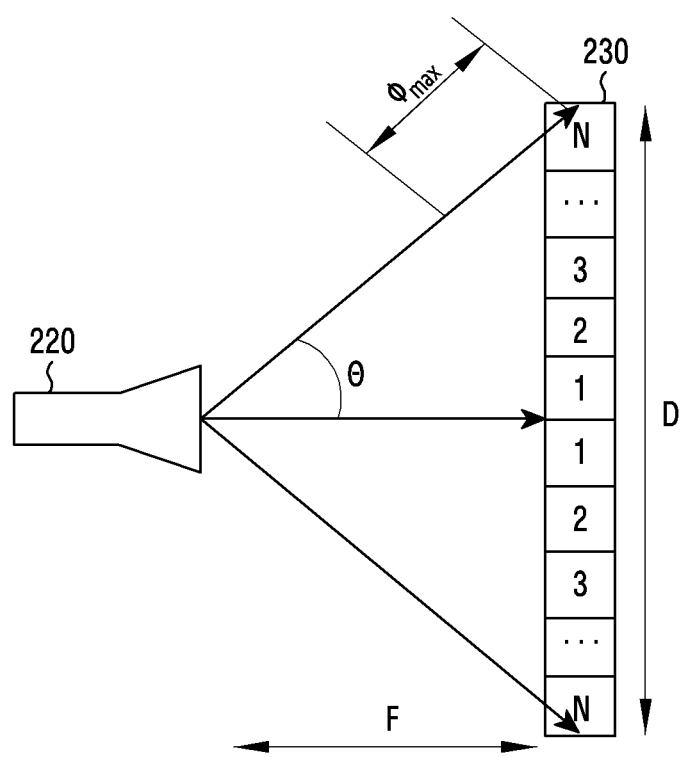
FIG. 4B illustrates improvement of a beam gain through a lens in a wireless communication system according to an embodiment of the disclosure.
Figure 4C:
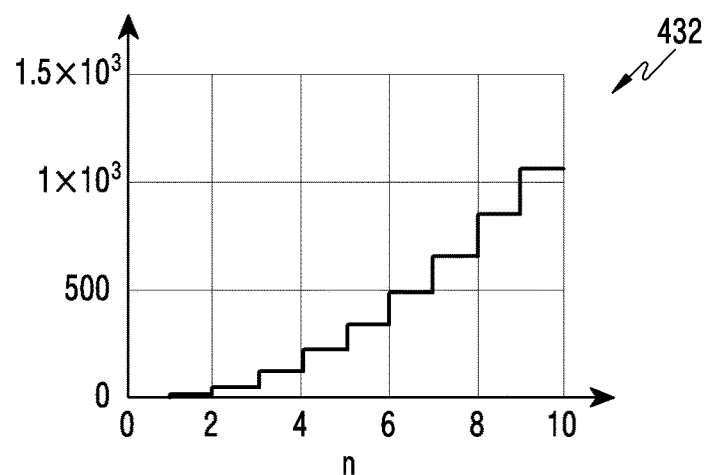
FIG. 4C illustrates improvement of a beam gain through a lens in a wireless communication system according to an embodiment of the disclosure.
Figure 4C:
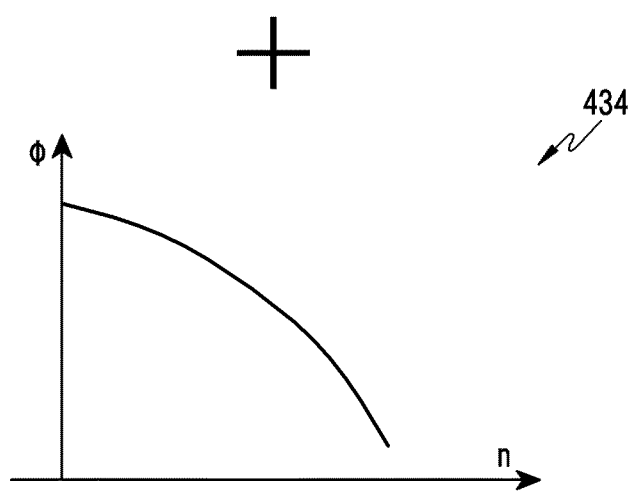
Figure 4C:
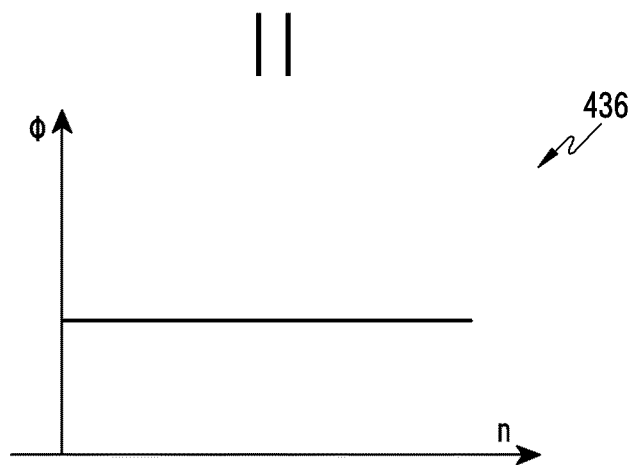

FIGS. 4A to 4C illustrate improvements of a beam gain through a lens in wireless communication systems according to embodiments of the disclosure.

Referring to FIG. 4A, a signal emitted from the antenna array 220 passes through the lens 230. Accordingly, a beam 404 having passed through the lens 230 may have a narrower beam width than a beam 402 emitted from the antenna array 220. Gain improvement by the lens 230 is achieved by converting the in-phase from the surface of a sphere to the plane. That is, because the beam generated in the antenna array 220 is emitted from the center of the antenna, that is, from the focus of the beam, an in-phase surface is formed on the surface of a sphere centered at the focus. The lens 230 converts the in-phase surface to the plane by using unit cells.

Referring to FIG. 4B, when a radius of the lens 230 and a distance between the lens 230 and the antenna array 220 is given, a maximum phase difference of the signal observed on the surface of the lens 230 is expressed by Equation 1 below.

$$\Phi_{max} = \frac{2\pi}{\lambda}\left[\sqrt{1+\left(\frac{D}{2F}\right)^2} - 1\right]$$ Equation 1

In Equation 1, $\Phi_{max}$ represents a maximum phase difference, $\lambda$ represents a wavelength, D represents a radius of the lens, and F represents a distance between the lens and the antenna array.

A phase profile change of the beam emitted from the antenna array 220 is shown in FIG. 4C.

Referring to FIG. 4C, graph 432 shows a phase profile on the plane (e.g., the surface of the lens 230 or a plane parallel to the surface of the lens 230) of the beam emitted from the antenna array 220, graph 434 shows a phase profile of the lens 230, and graph 436 shows an in-phase profile of the beam passed through the lens 230. As shown in graph 432, as distance n from the center of the plane increases, a phase difference with the center increases. Therefore, as shown in graph 434, to compensate for the phase profile as in graph 432, the lens 230 is designed such that a phase difference from the center decreases as a distance from the center increases. Accordingly, the phase profile of the beam passed through the lens 230 is in phase or substantially in phase with respect to the plane, as shown in graph 436.

As described in the above, the beam emitted from the antenna array 220 passes through the lens 230. Here, an area including unit cells contacting a beam (or beams) from among the unit cells included in the lens 230 may be referred to as "a projection area (illuminated field)". An area of the illuminated field may influence a signal gain improvement effect by the lens 230. A relationship between the area of the illuminated field and a signal gain improvement effect will be described below with reference to FIG. 5 and FIGS. 6A to 6D.

Figure 5:
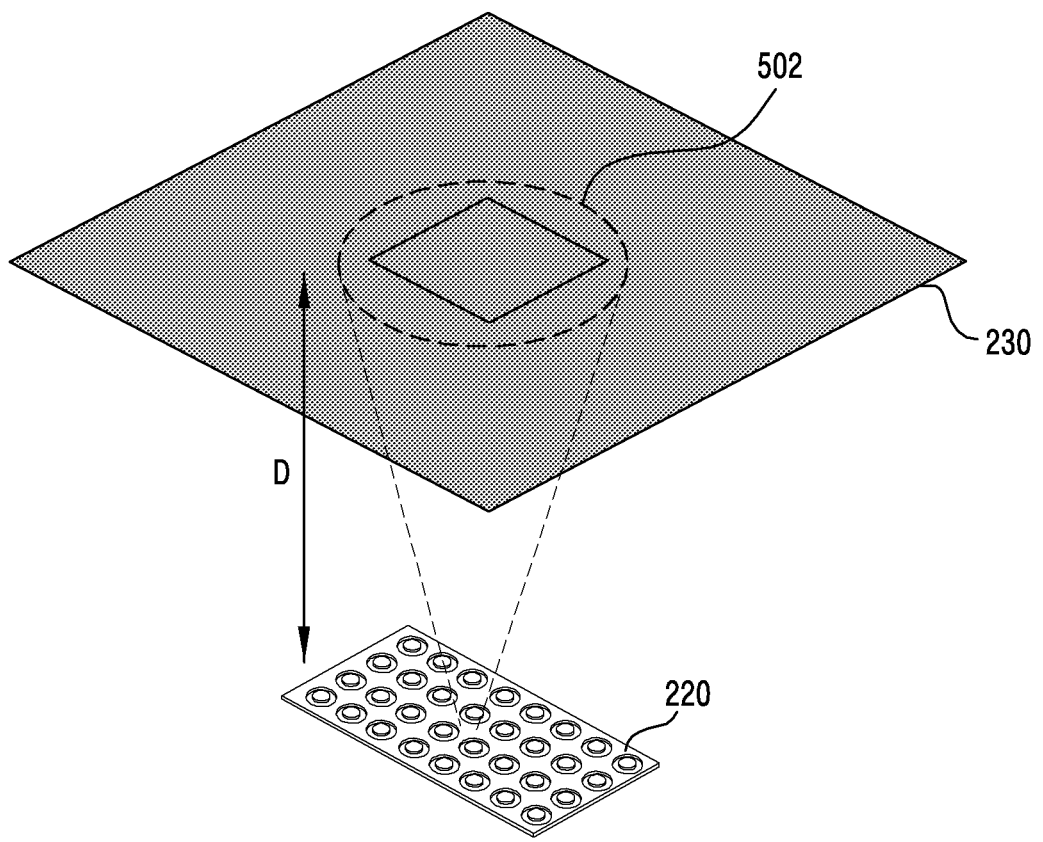
FIG. 5 illustrates an illuminated field of a beam with respect to a lens in a wireless communication system according to an embodiment of the disclosure.

FIG. 5 illustrates an illuminated field of a beam with respect to a lens in a wireless communication system according to an embodiment of the disclosure.

Referring to FIG. 5, an illuminated field 502 is a physical area in which a signal emitted from the antenna array 220 contacts the lens 230. Because the signal is emitted with a particular angle, a width of the illuminated field 520 depends on distance D between the antenna array 220 and the lens 230.

FIGS. 6A to 6D illustrate examples of areas and gains of various illuminated fields based on distances between a lens and an antenna array in wireless communication systems according to embodiments of the disclosure.

Figure 6A:
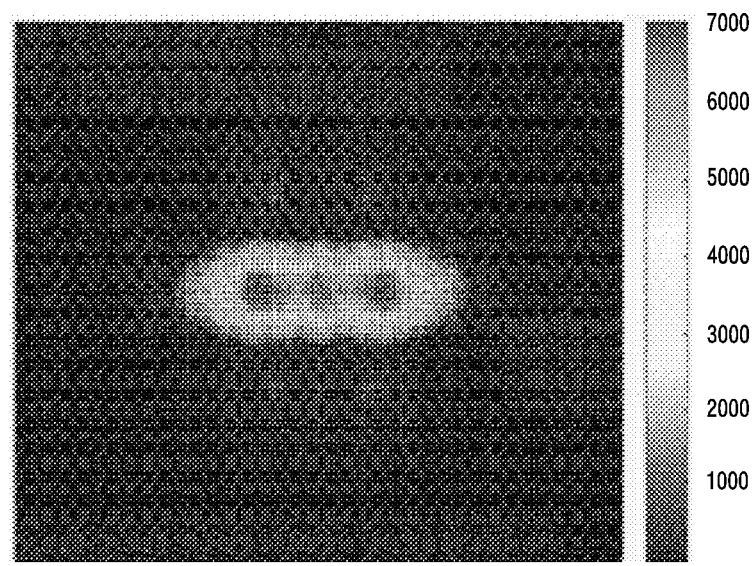
FIG. 6A illustrates an example of areas and gains of various illuminated fields based on distances between a lens and an antenna array in a wireless communication system according to an embodiment of the disclosure.
Figure 6A:
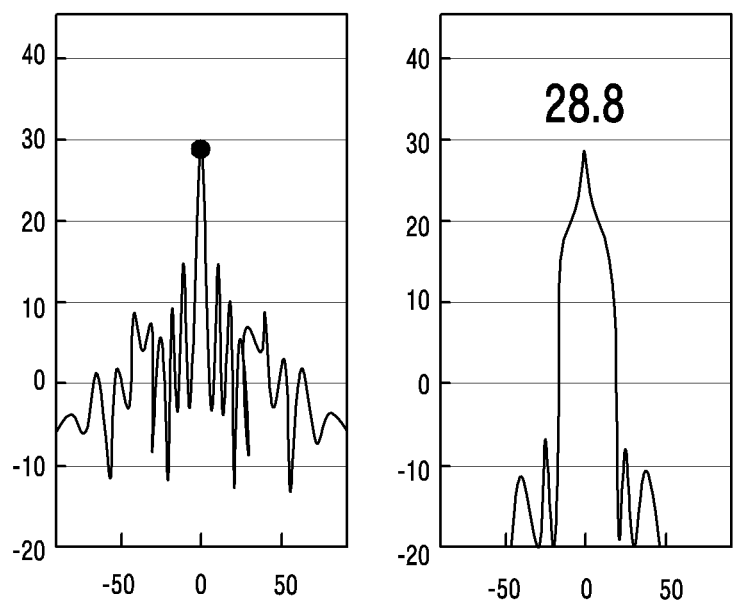
Figure 6B:
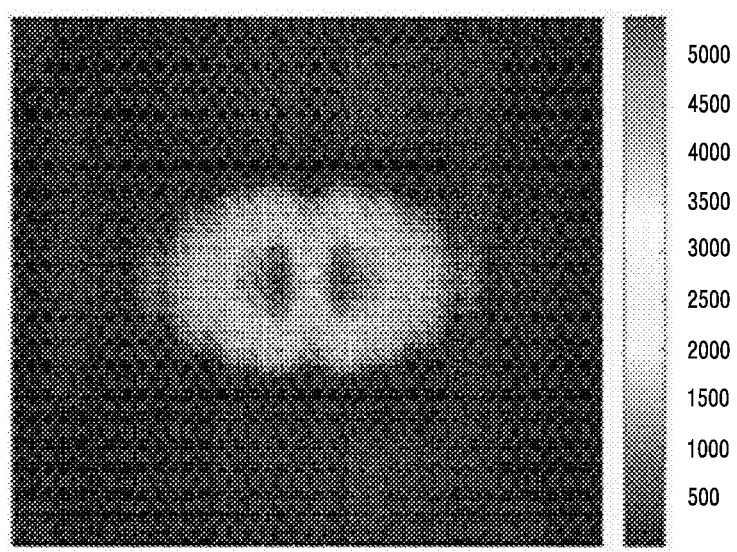
FIGS. 6B, 6C and 6D illustrate examples of areas and gains of various illuminated fields based on distances between a lens and an antenna array in a wireless communication system according to an embodiment of the disclosure.
Figure 6B:
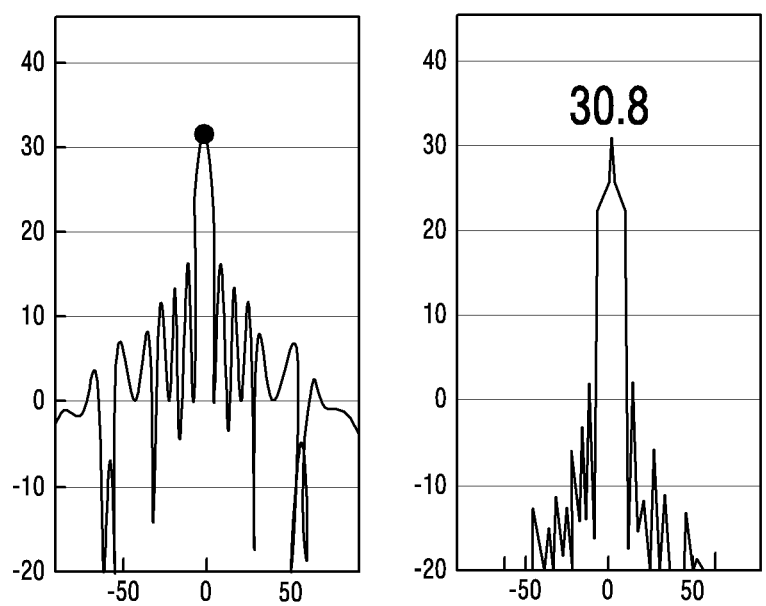
Figure 6C:
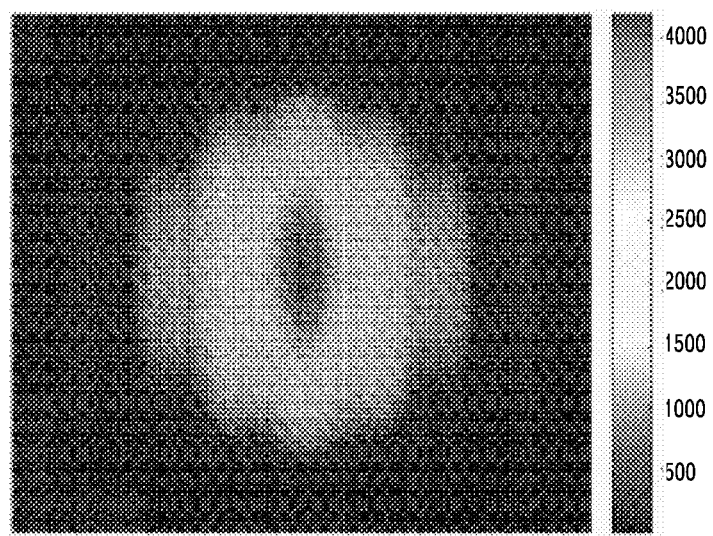
Figure 6C:
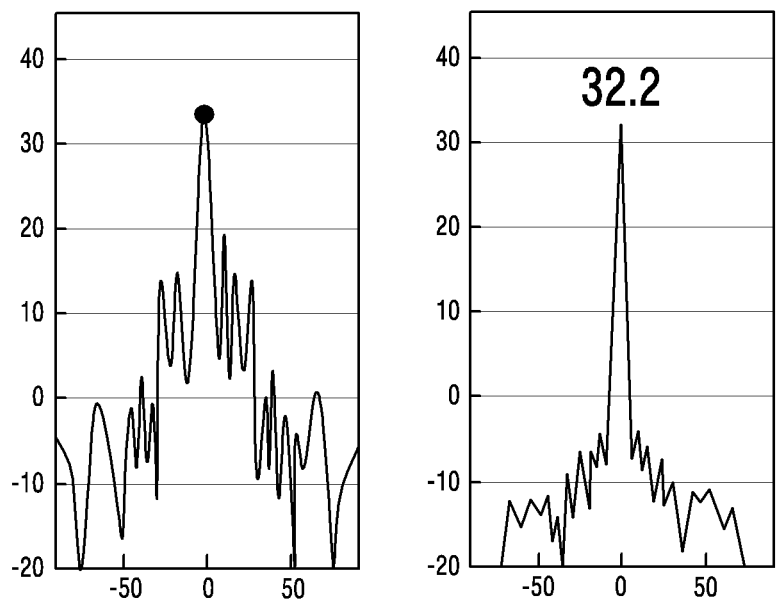
Figure 6D:
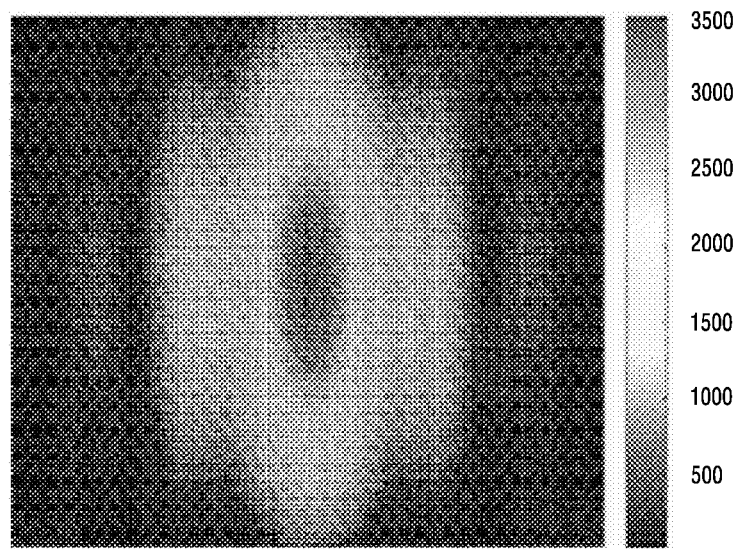
Figure 6D:
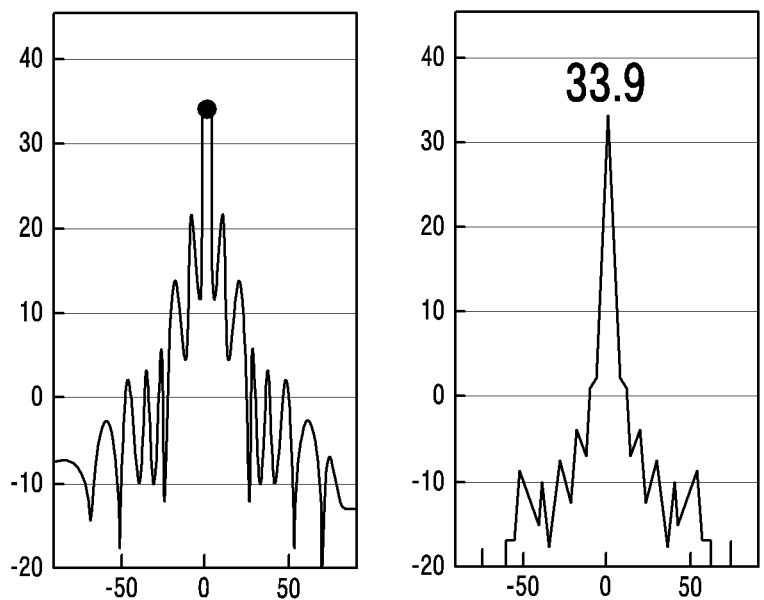

FIGS. 6A, 6B, 6C and 6D show experimental results obtained when a distance D between the antenna array 220 and the lens 230 is varied. FIG. 6A illustrates a result measured at a distance of about 5 cm, FIG. 6B illustrates a result measured at a distance of about 10 cm, FIG. 6C illustrates a result measured at a distance of about 20 cm, and FIG. 6D illustrates a result measured at a distance of about 30 cm.

Referring to FIGS. 6A to 6D, it is identified that the area of the illuminated field increases as the distance D increases. Also, as the area of the illuminated field increases, it is identified that the signal gain increases to 28.8 dB, 30.8 dB, 32.2 dB, and 33.9 dB, respectively.

As shown in FIGS. 6A to 6D, the distance between the antenna array and the lens is related to signal gain improvement. This is because lens performance is determined by a distribution area of an EM or E-field projected on the lens. However, increasing the distance between the antenna array and the lens causes an increase in a size of the device, i.e., a set volume. That is, increasing the distance between the antenna array and the lens may hinder the mountability/mass productivity of the lens. Therefore, the disclosure proposes various embodiments for increasing the area of the illuminated field at a relatively short distance, as shown in FIGS. 7A to 7C below.

Figure 7A:
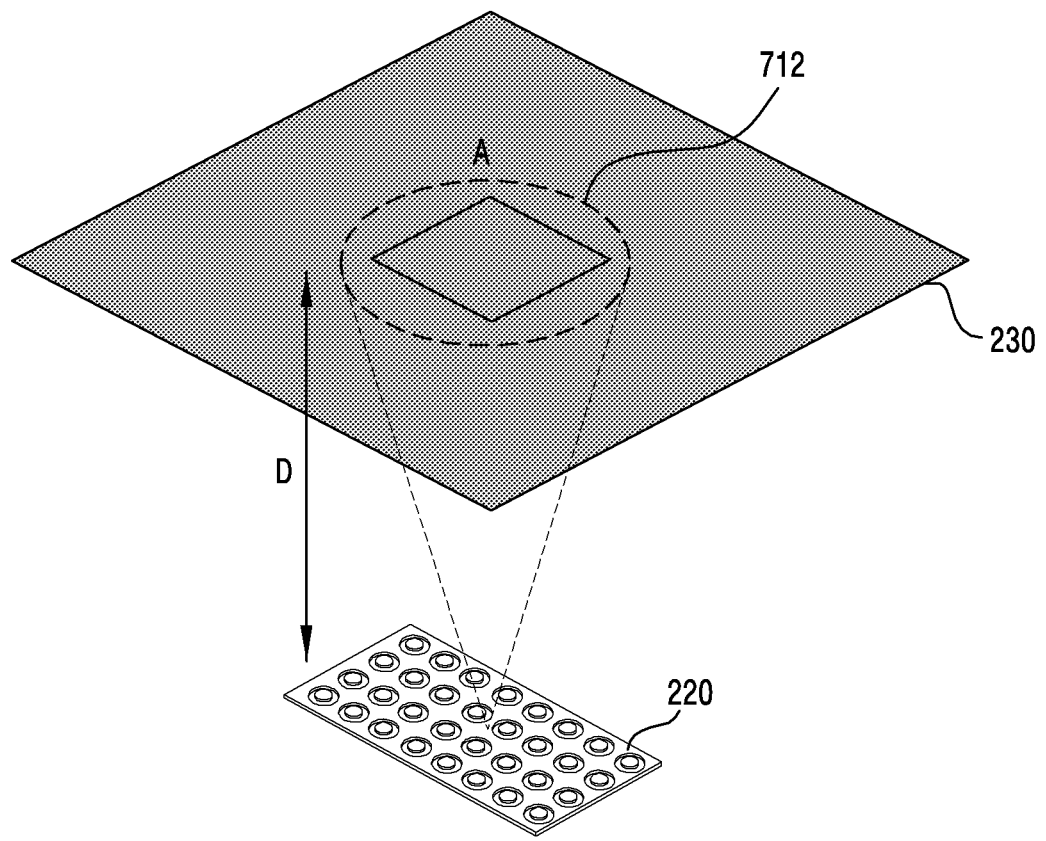
FIGS. 7A, 7B and 7C illustrate principles for reducing distances between a lens and an antenna array in wireless communication systems according to embodiments of the disclosure.
Figure 7B:
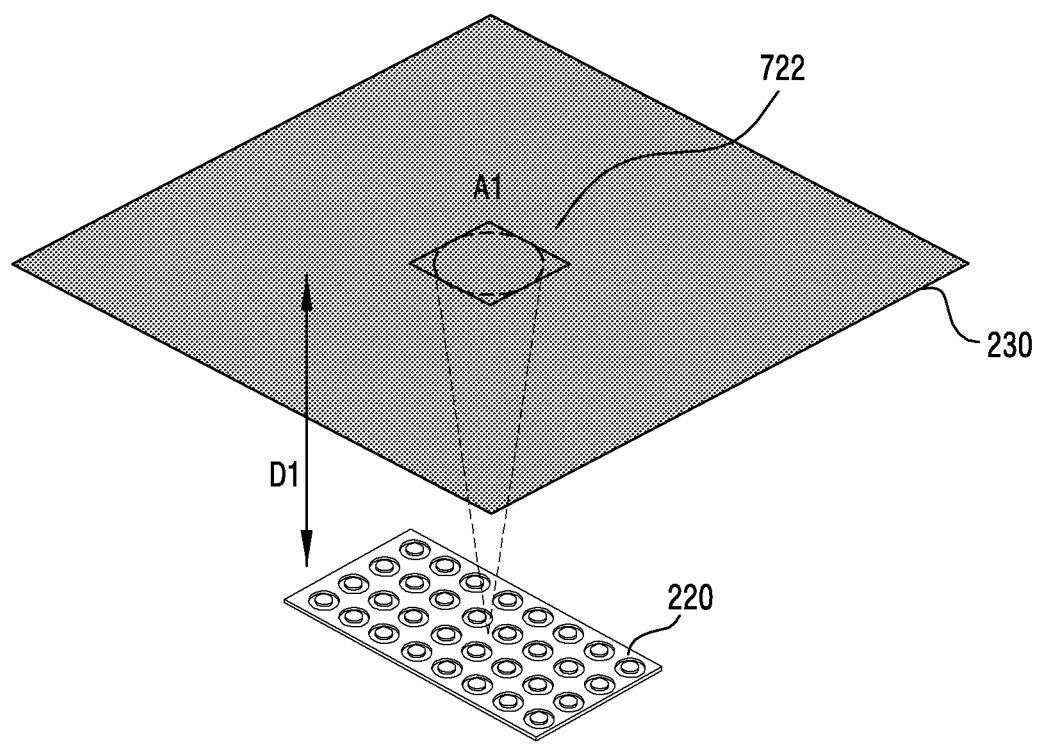
Figure 7C:
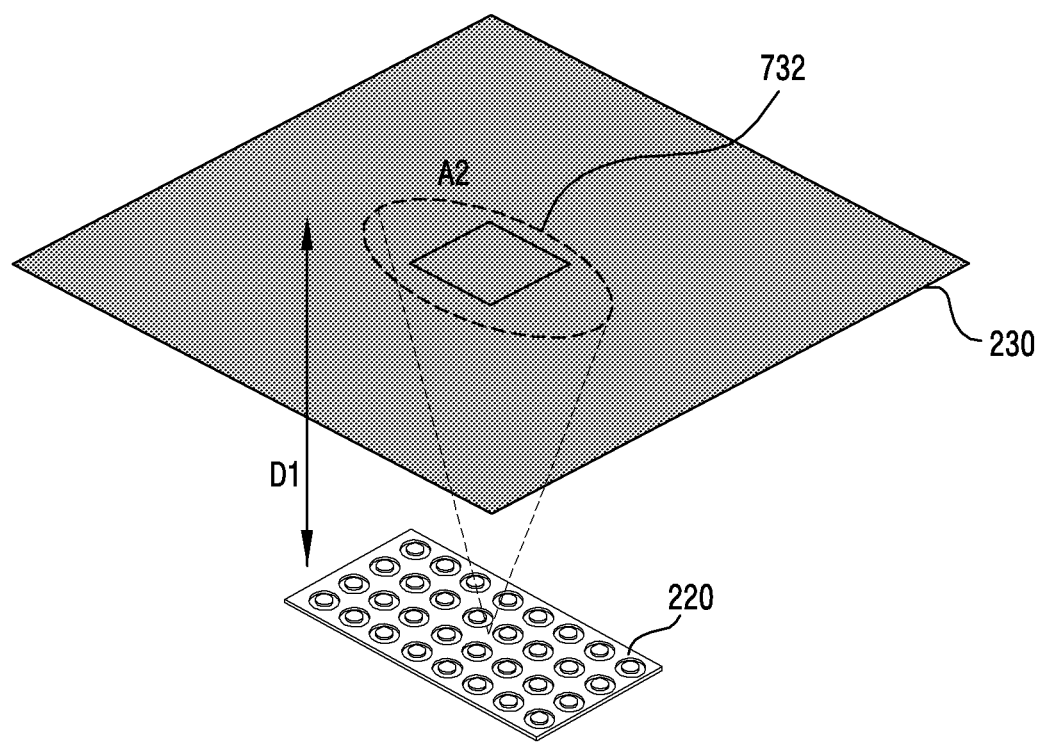

FIGS. 7A to 7C illustrate principles for reducing distances between a lens and an antenna array in wireless communication systems according to embodiments of the disclosure.

Referring to FIG. 7A, in the case of distance D, an area of an illuminated field 712 is A. When a distance is reduced from D to D1 without changing the antenna array 220, the area of an illuminated field 722 decreases to A1 as shown in FIG. 7B. At this time, as shown in FIG. 7C, if a beam width of a beam emitted from the antenna array 220 is widened, even if the distance is D1, an illuminated field 732 may be ensured to have a size of A2 that is larger than a size of A1. That is, the beam adjustment technique according to various embodiments may increase the area of the illuminated field in the lens 230 by relatively widening the beam width of the signal emitted from the antenna array 220, so as to enhance signal gain improvement capability of the lens 230.

Figure 8A:
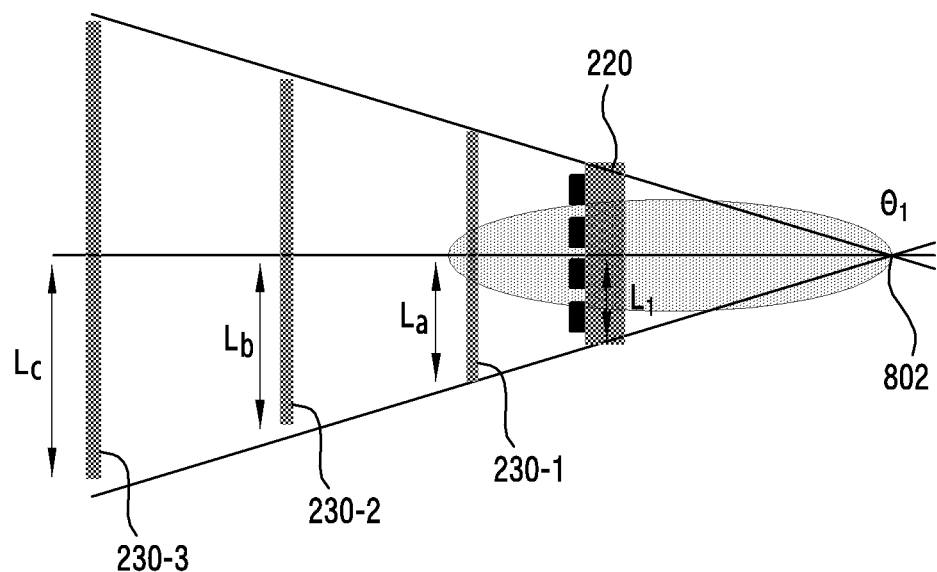
FIGS. 8A and 8B illustrate areas of illuminated fields of beams having different widths in wireless communication systems according to embodiments of the disclosure.
Figure 8B:
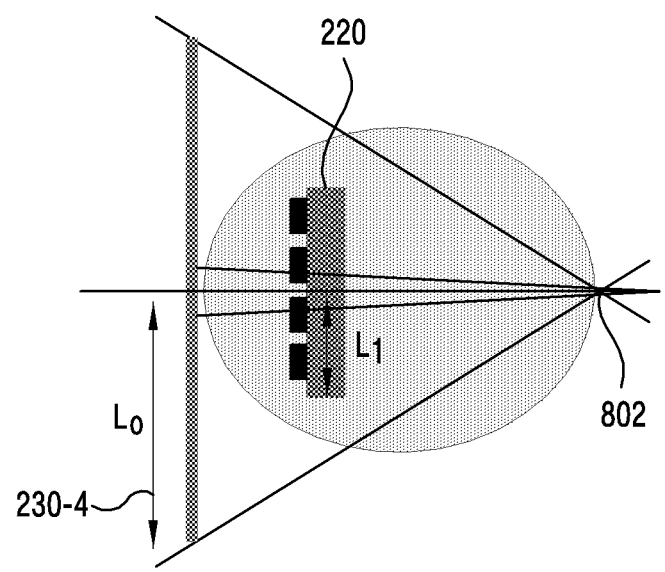

A comparison of the area of the illuminated field according to the beam width is shown in FIGS. 8A and 8B.

FIGS. 8A and 8B illustrate areas of illuminated fields of beams having different widths in wireless communication systems according to various embodiments of the disclosure.

FIG. 8A illustrates a relatively narrow beam, and FIG. 8B illustrates a relatively wide beam.

Referring to FIG. 8A, a beam generated at the antenna array 220 is emitted from a virtual focus 802, while being widened at angle θ1. When three lenses, lens A 230-1, lens B 230-2, and lens C 230-3 are arranged as shown in FIG. 8A, because the three lenses are spaced away from the antenna array 220 in the order of the lens A 230-1, the lens B 230-2, and the lens C 230-3, the gains may increase in the order of the lens A 230-1, the lens B 230-2, and the lens C 230-3. For example, the gains of the lenses are shown in Table 1 below.

TABLE 1

|  | L (an effective distance of a lens) | Gain |
|---|---|---|
| Lens A | La = L1 | G1 (=π/θ1) |
| Lens B | Lb = 2 × L1 | G1 + 3 dB |
| Lens C | Lc = 4 × L1 | G1 + 6 dB |

Referring to FIG. 8B, the beam generated at the antenna array 220 is emitted, while being widened, from a virtual focal point, and has a wider beam width compared to the case of FIG. 8A. As shown in FIG. 8B, even if lens O 230-4 is disposed at a shorter distance compared to the case shown in FIG. 8A, a higher gain may be obtained due to the wide beam width of the signal. For example, the gain of the lens O 230-4 may be expressed as shown in Table 2 below.

TABLE 2

|  | L (an effective distance of a lens) | Gain |
|---|---|---|
| Lens 0 | L0 = k × L1 | G1 + 10log(k) |

It is difficult to implement widening of a beam width, shown in FIG. 8B, in a device using a single antenna. In order to widen a beam width, it is required to have an antenna array (e.g., the antenna array 220) or a higher order resonant antenna. At this time, it is preferable to use an antenna array in consideration of beam directivity assignment, i.e., a steering function of the beams. That is, when an array antenna is used, not only the beam width but also the directivity of the beam may be controlled.

Figure 9:
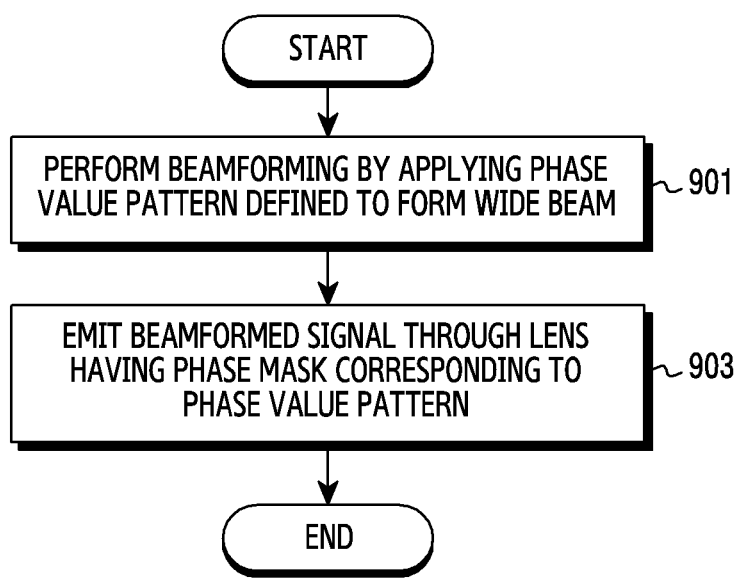
FIG. 9 illustrates a flow diagram for adjusting a beam by using a lens in a wireless communication system according to an embodiment of the disclosure.

FIG. 9 illustrates a flow diagram for adjusting a beam by using a lens in a wireless communication system according to an embodiment of the disclosure. For example, FIG. 9 illustrates an operation method of the terminal 120.

Referring to FIG. 9, at operation 901 the terminal performs beamforming by applying a phase value pattern defined to form a wide beam. Here, the wide beam refers to a beam having a wide beam width relative to a beam to which the phase value pattern is not applied. The phase value pattern is a control factor separate from the phase/magnitude values (e.g., an analog beamformer) for beamforming in consideration of a channel (e.g., beamforming for applying directivity), and means a combination of phase values defined in relation to a lens. By the wide beam, an illuminated field of a beam emitted from an antenna array to the lens may be widened.

At operation 903, the terminal emits a beamformed signal through a lens having a phase mask corresponding to the phase value pattern. That is, the lens is disposed at a particular distance in a signal emission direction of the antenna array, and a signal of a wide beam, to which the phase pattern value has been applied, is thus emitted through the lens to a wireless channel. As the signal passes through the lens, an isotropic surface of the signal becomes identical or substantially similar to a lens plane, and consequently a signal gain maybe improved.

As described above, the device (e.g., a terminal and a base station) according to various embodiments may increase the beam width of a signal emitted from the antenna array, thereby increasing utilization of the lens. Moreover, by a solution of widening a beam width, a distance between the antenna array and the lens may become very short, which causes reduction in a set volume.

In order to effectively improve lens performance due to widening of the beam width, an appropriate phase value pattern for beam width adjustment will have to be used. Accordingly, hereinafter, the disclosure describes examples of spacing of antenna arrays and lenses, as well as specific phase value patterns, and describes related simulation or experimental results. For convenience of the following description, a beam in which the width thereof is not widened according to various embodiments is referred to as "a narrow beam" or "a single beam".

In the following description, the antenna array is illustrated as a two-dimensional antenna array having a size of 4×8. In a two-dimensional antenna array, a beam width of the elevation axis may be adjusted by a phase difference between rows, and a beam width of the azimuth axis may be adjusted by a phase difference between columns. However, various embodiments are not limited to the two-dimensional antenna array of size 4×8.

Figure 10A:
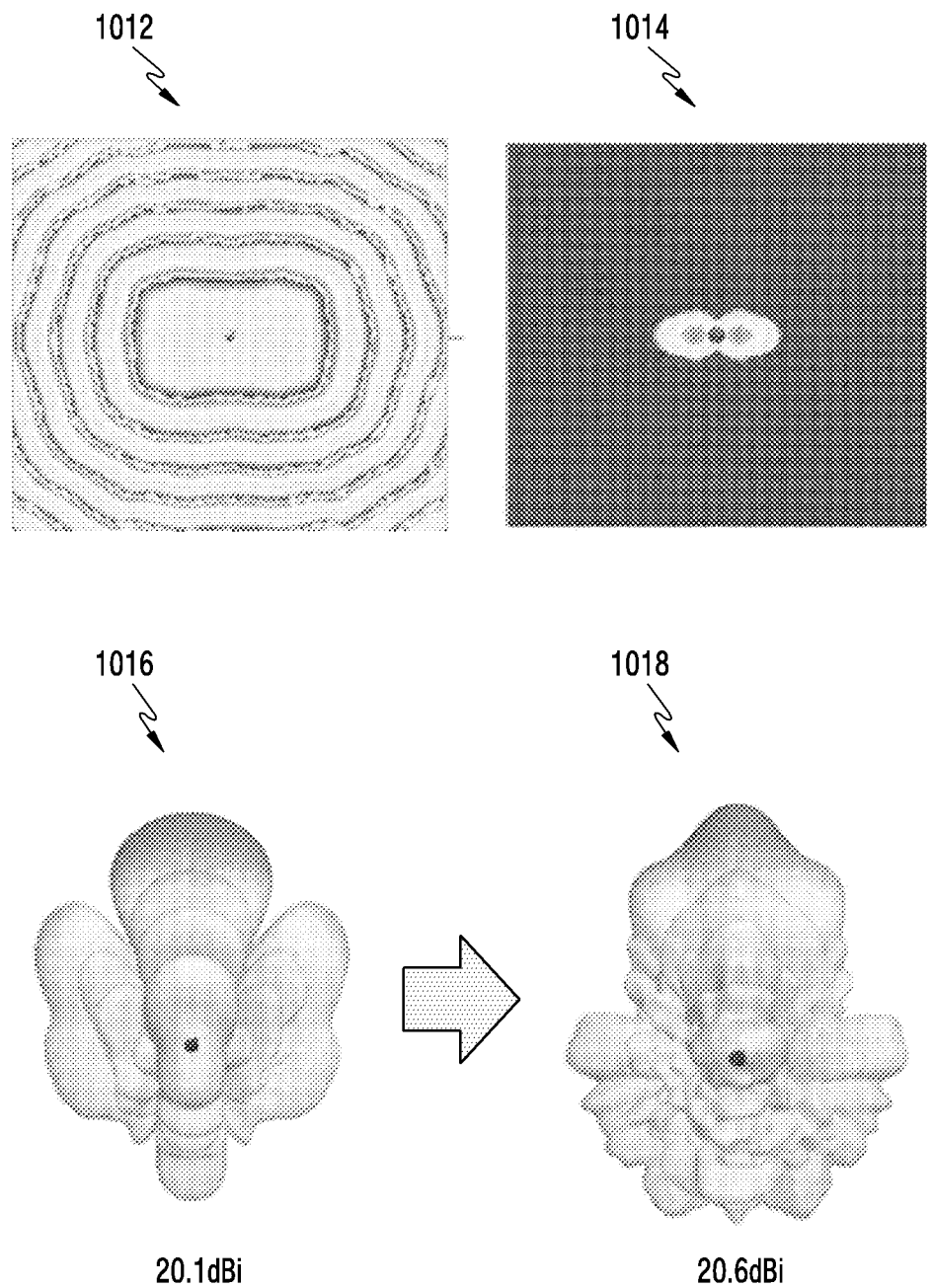
FIGS. 10A, 10B and 10C illustrate examples of beam gains and beam shapes when a wide beam is projected onto a lens in wireless communication systems according to embodiments of the disclosure.
Figure 10B:
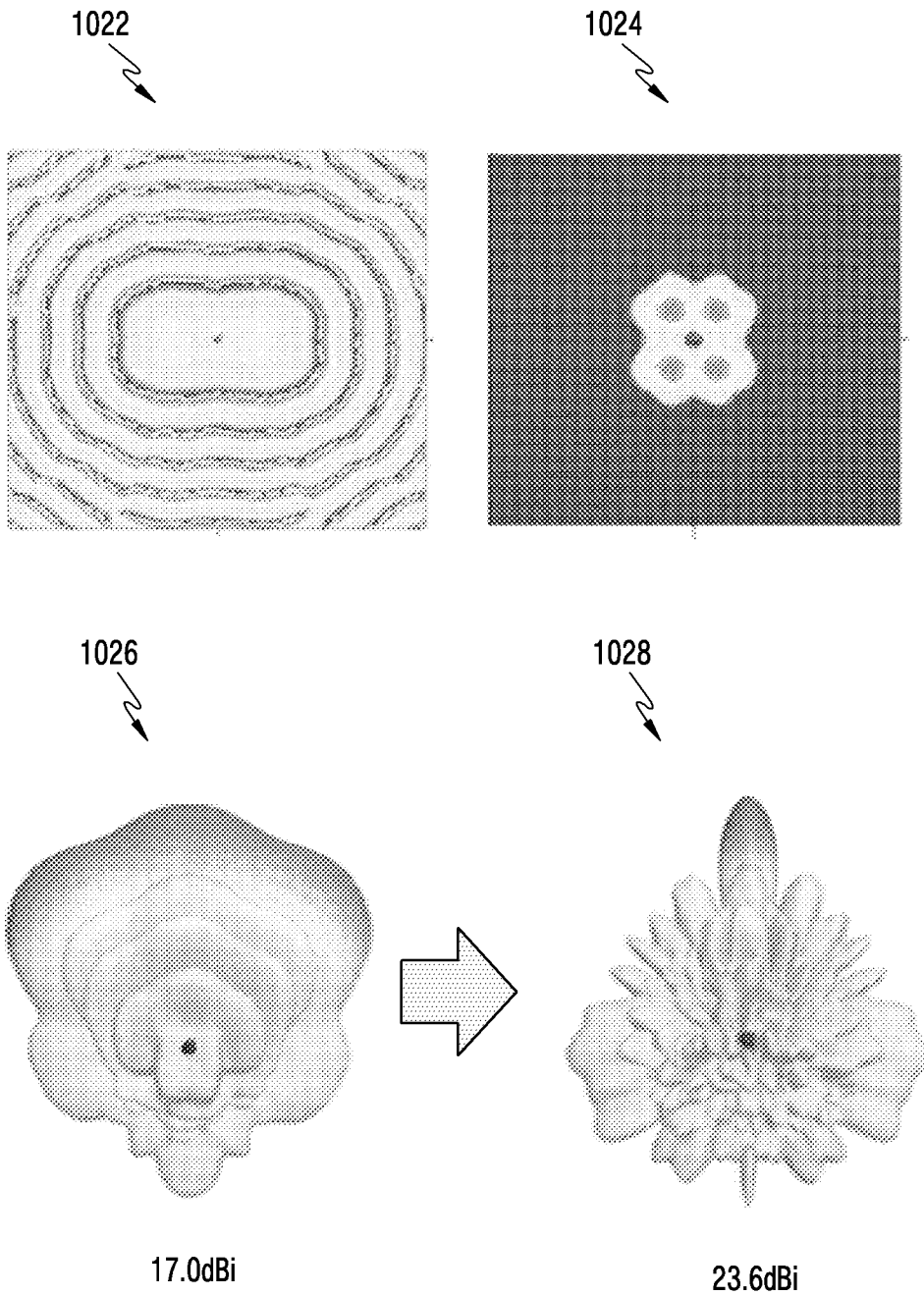
Figure 10C:
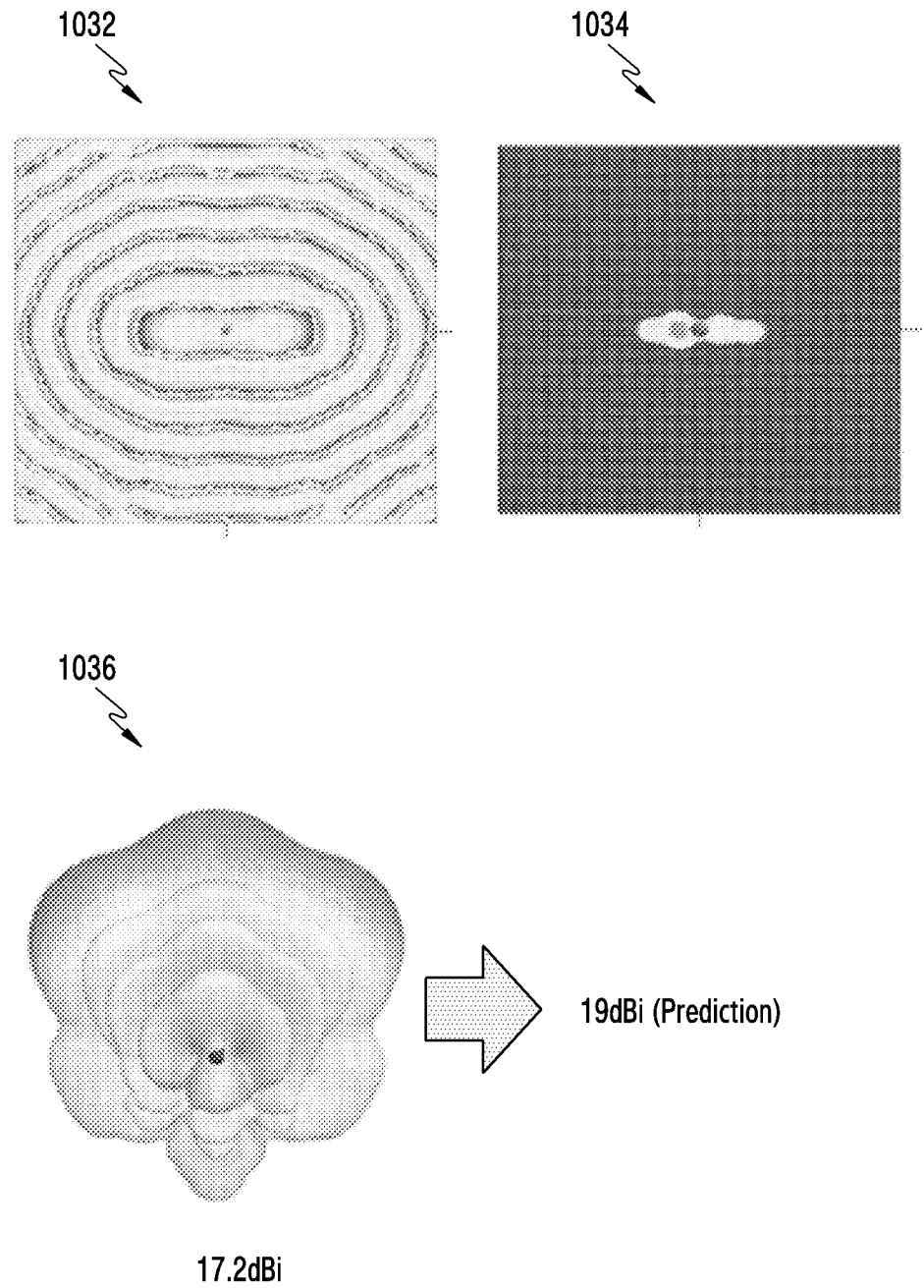

FIGS. 10A to 10C illustrate examples of a beam gain and a beam shape when a wide beam is projected onto a lens in wireless communication systems according to embodiments of the disclosure.

FIGS. 10A, 10B and 10C each illustrate a case where a beam width is adjusted in the elevation axis.

FIG. 10A shows a case where a phase value pattern having a relative phase of 0, 0, 0, 0 between rows of an antenna array is used, FIG. 10B shows a case where a phase value pattern having relative phases of 0, 90, 90, 0 between rows of the antenna array is used, and FIG. 10C shows a case where a phase value pattern having relative phases of 0, −90, −90, 0 between rows of the antenna array is used. That is, FIG. 10A shows a case where a narrow beam is used, FIG. 10B shows a case where a wide beam of a scheme, in which a phase is decreased as moving towards the outer side from the center of the antenna array, is used, and FIG. 10C shows a case where a wide beam of a scheme, in which a phase is increased as moving towards the outer side from the center of the antenna array, is used. Accordingly, the lenses are different in phase masks 1012, 1022, and 1023 depending on the phase value pattern.

Referring to signal magnitude distributions 1014, 1024, and 1034 on the lens, it is identified that the case of FIG. 10B shows an area of the maximum illuminated field. In the case of FIG. 10C, the area of the illuminated field is narrower than that in the case of FIG. 10A using a narrow beam. Referring to gain variation, beam shapes 1016, 1026, and 1036 before lens projection change into beam shapes 1018 and 1028, etc., as the beams pass through the lens. Accordingly, a gain increases about 0.5 dBi even in the case of FIG. 10A using a narrow beam. However, the case of FIG. 10B and FIG. 10C using a wide beam show relatively greater gain improvement of about 6.6 dBi and 1.8 dBi.

Figure 11A:
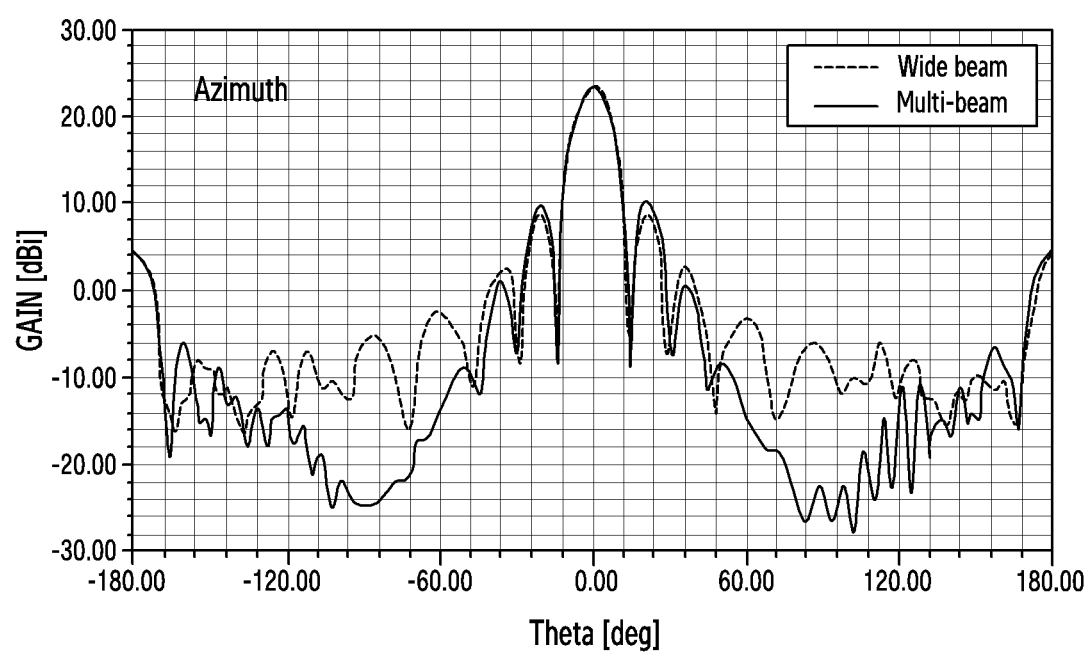
FIGS. 11A and 11B illustrate performance graphs when a wide beam is projected onto a lens in wireless communication systems according to embodiments of the disclosure.
Figure 11B:
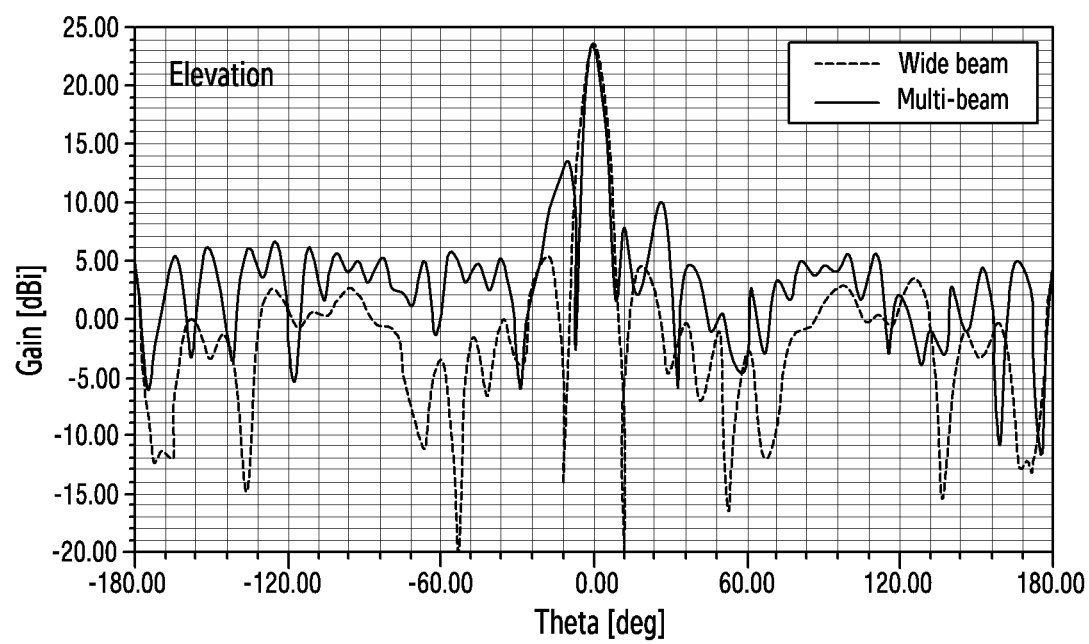

FIGS. 11A and 11B illustrate performance graphs when a wide beam is projected onto a lens in wireless communication systems according to embodiments of the disclosure.

FIGS. 11A and 11B are graphs for comparison of a gain of a case using a wide beam with a gain of a case using a multi-beam according to embodiments of the disclosure. Here, the case of using a multi-beam, unlike the case of using a wide beam, corresponds to a solution for widening the area of the illuminated field by forming a plurality of beams and is presented for comparison.

FIG. 11A illustrates a gain change according to an angle in the azimuth axis, and FIG. 11B illustrates a gain change according to an angle in the vertical axis.

Referring to FIGS. 11A and 11B, the case of using a wide beam generally shows a high gain in the azimuth axis, and the case of using a multi-beam generally shows a high gain in the elevation axis. In general, when a terminal communicates with a base station, because a change in an azimuth is most likely to be large, a high gain in the azimuth axis will be more advantageous for improving an actual communication quality.

Results of experiments under various conditions including the cases of FIGS. 10A to 10C and FIGS. 11A and 11B are shown in Table 3.

TABLE 3

|  | No lens used | Narrow beam | Multi-beam | Multi-beam | Wide beam |
|---|---|---|---|---|---|
| Distance between antenna and lens |  | 20 mm | 20 mm | 50 mm | 20 mm |
| x-z HPBW (half power beam width) | 23.23° | 13.20° | 8.78° | 5.91° | 6.85° |
| x-z HPBW | 11.78° | 12.37° | 11.99° | 12.47° | 12.21° |
| Gain | 20.1 dBi | 20.6 dBi (+0.5 dB) | 21.6 dBi (+1.5 dB) | 23.1 dBi (+3.0 dB) | 23.6 dBi (+3.5 dB) |

Figure 12A:
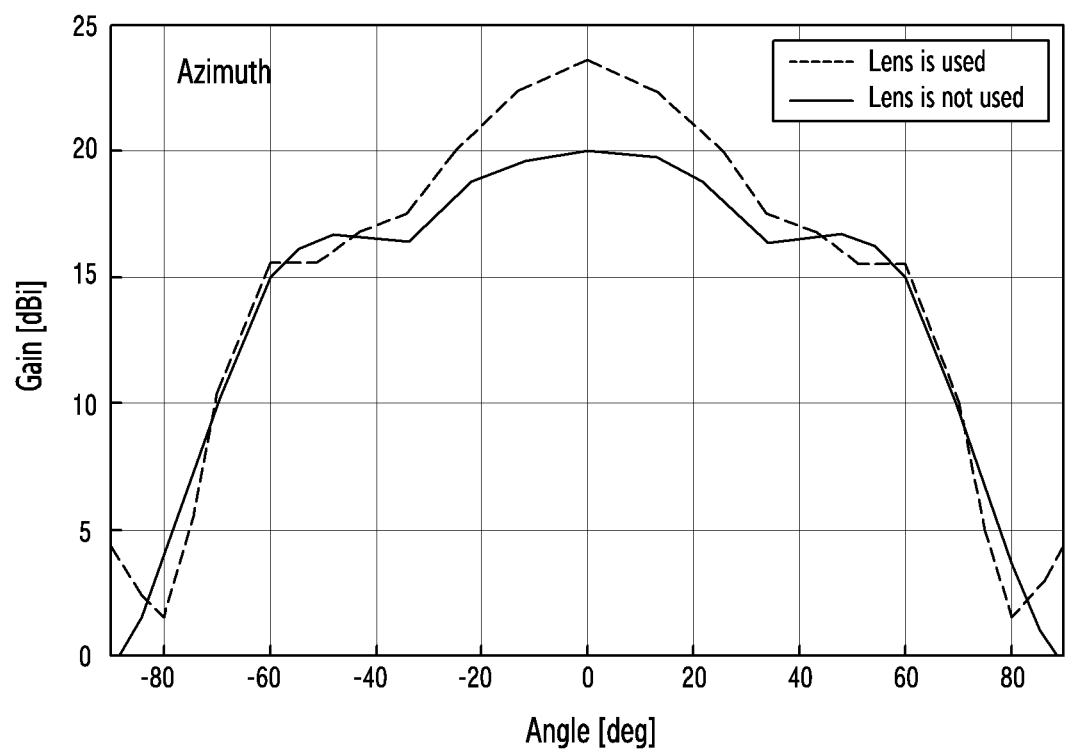
FIGS. 12A and 12B illustrate graphs for comparison of gain improvements in an azimuth axis and an elevation axis by use of a lens in a wireless communication system according to embodiments of the disclosure.
Figure 12B:
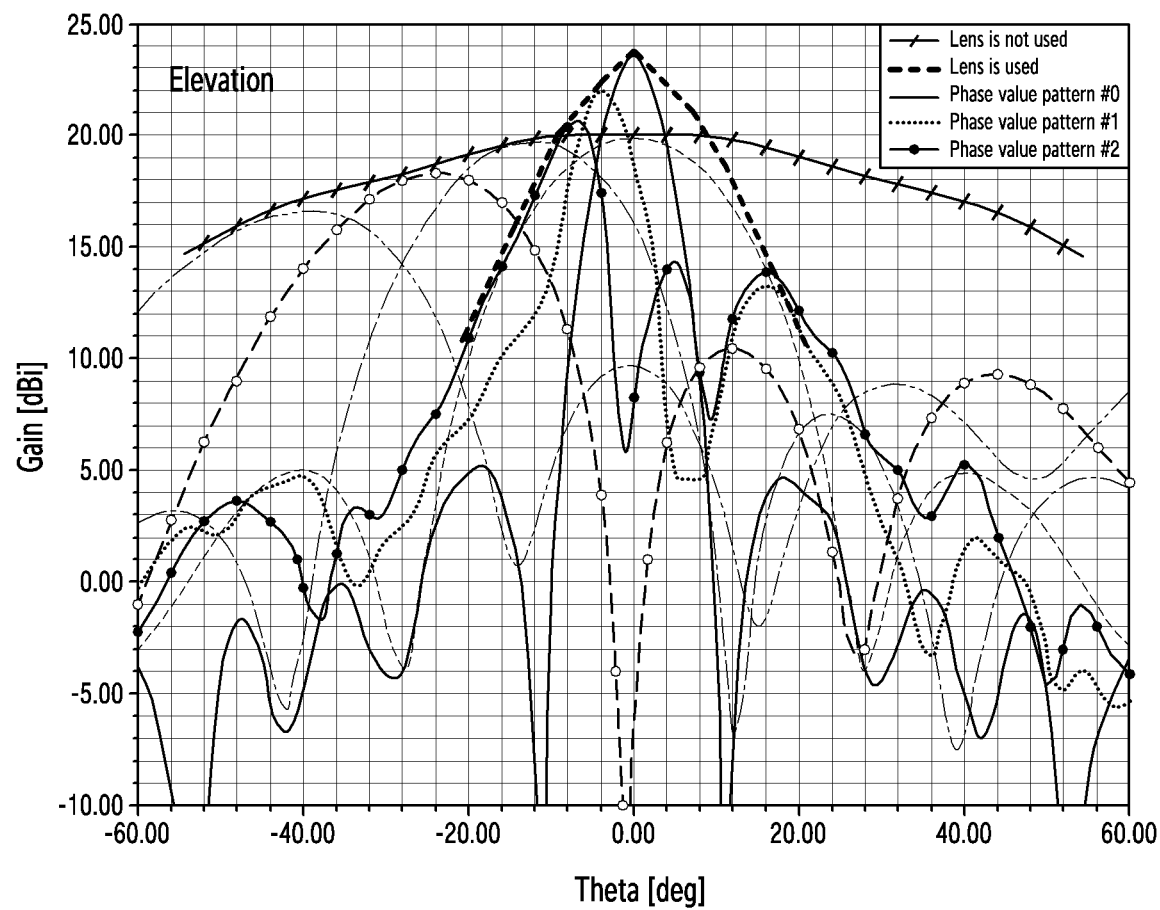

FIGS. 12A and 12B illustrate graphs for comparison of gain improvements in the azimuth axis and the elevation axis by use of a lens in a wireless communication system according to various embodiments of the disclosure. FIGS. 12A and 12B are graphs for comparison of a gain when a lens is used with a gain when the lens is not used.

Referring to FIG. 12A, when the lens is used, it is identified that a gain is improved in most angular areas in the azimuth axis. Referring to FIG. 12B, when the lens is used, it is identified that a gain is improved in some angular areas in the elevation axis. In a case of FIG. 12B, three phase value patterns are applied, and specific examples of the respective phase value patterns are shown in Table 4, Table 5, and Table 6 below. In the following Table 4, Table 5, and Table 6, rows and columns of the respective tables correspond to rows and columns of antenna elements of the antenna array. That is, in the tables, a value stated in a first row and a first column is a phase value applied to a signal transmitted from an antenna element located in a first row and a first column of the antenna array.

TABLE 4

| Phase | 0 | 0 | 0 | 0 | 0 | 0 | 0 | 0 |
|---|---|---|---|---|---|---|---|---|
| Value | 90 | 90 | 90 | 90 | 90 | 90 | 90 | 90 |
| Pattern | 90 | 90 | 90 | 90 | 90 | 90 | 90 | 90 |
| #0 | 0 | 0 | 0 | 0 | 0 | 0 | 0 | 0 |

TABLE 5

| Phase | 0 | 0 | 0 | 0 | 0 | 0 | 0 | 0 |
|---|---|---|---|---|---|---|---|---|
| Value | 135 | 135 | 135 | 135 | 135 | 135 | 135 | 135 |
| Pattern | 180 | 180 | 180 | 180 | 180 | 180 | 180 | 180 |
| #1 | 135 | 135 | 135 | 135 | 135 | 135 | 135 | 135 |

TABLE 6

| Phase | 0 | 0 | 0 | 0 | 0 | 0 | 0 | 0 |
|---|---|---|---|---|---|---|---|---|
| Value | 180 | 180 | 180 | 180 | 180 | 180 | 180 | 180 |
| Pattern | 270 | 270 | 270 | 270 | 270 | 270 | 270 | 270 |
| #2 | 270 | 270 | 270 | 270 | 270 | 270 | 270 | 270 |

Experimental environment and results of FIGS. 12A and 12B are summarized in Table 7 below.

TABLE 7

| Beam types | Wide beam |
|---|---|
| Distance between antenna and lens | 20 mm |
| Size | 201 × 201 mm2 |
| Material | PC |
| Gain | 23.6 dBi |
| Azimuth coverage | ±43° Gain improvement area |
| Elevation coverage | ±9° Gain improvement area |

Figure 13:
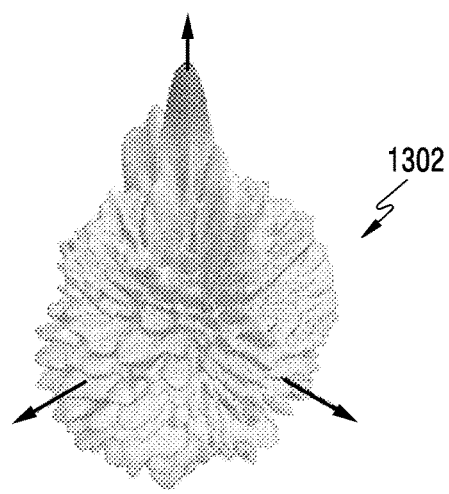
FIG. 13 illustrates examples of beam shapes based on different phase value patterns in a wireless communication system according to an embodiment of the disclosure.
Figure 13:
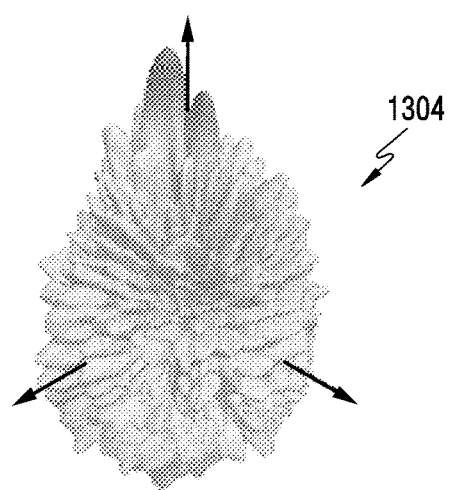
Figure 13:
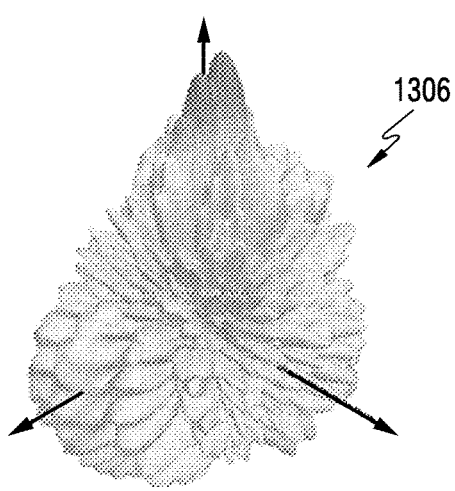

FIG. 13 illustrates examples of beam shapes based on different phase value patterns in wireless communication systems according to embodiments of the disclosure.

Referring to FIG. 13, FIG. 13 illustrates beam shapes in the cases where a boresight, an azimuth tilt, and an elevation are applied. The phase value pattern and characteristic of each of a boresight beam shape 1302, a beam shape 1304 tilted in the azimuth axis, and a beam shape 1306 tilted in the elevation axis in FIG. 13 are shown in Table 8, Table 9, and Table 10.

TABLE 8

| Phase value Pattern (Boresight) | 0 | 45 | 90 | 135 | 135 | 90 | 45 | 0 |
|---|---|---|---|---|---|---|---|---|
| | 90 | 135 | 180 | 225 | 225 | 180 | 135 | 90 |
| | 90 | 135 | 180 | 225 | 225 | 180 | 135 | 90 |
| | 0 | 45 | 90 | 135 | 135 | 90 | 45 | 0 |

TABLE 9

| Phase value Pattern (Azimuth tilt) | 0 | 90 | 180 | 270 | 315 | 315 | 315 | 315 |
|---|---|---|---|---|---|---|---|---|
| | 90 | 180 | 270 | 0 | 45 | 45 | 45 | 45 |
| | 90 | 180 | 270 | 0 | 45 | 45 | 45 | 45 |
| | 0 | 90 | 180 | 270 | 315 | 315 | 315 | 315 |

TABLE 10

| Phase value Pattern (Elevation tilt) | 0 | 45 | 90 | 135 | 135 | 90 | 45 | 0 |
|---|---|---|---|---|---|---|---|---|
| | 90 | 135 | 180 | 225 | 225 | 180 | 135 | 9 |
| | 180 | 225 | 270 | 315 | 315 | 270 | 225 | 180 |
| | 270 | 315 | 0 | 45 | 45 | 0 | 315 | 270 |

The characteristics of beams corresponding to Table 8, Table 9, and Table 10 are shown in Table 11 below.

TABLE 11

| | Beam shape 1302 | Beam shape 1304 | Beam shape 1306 |
|---|---|---|---|
| Gain | 28.8 dBi | — | 25.3 dBi |
| Angle | 0° | 5° | 5° |
| Gain improvement | — | 13° | 9° |

Figure 14A:
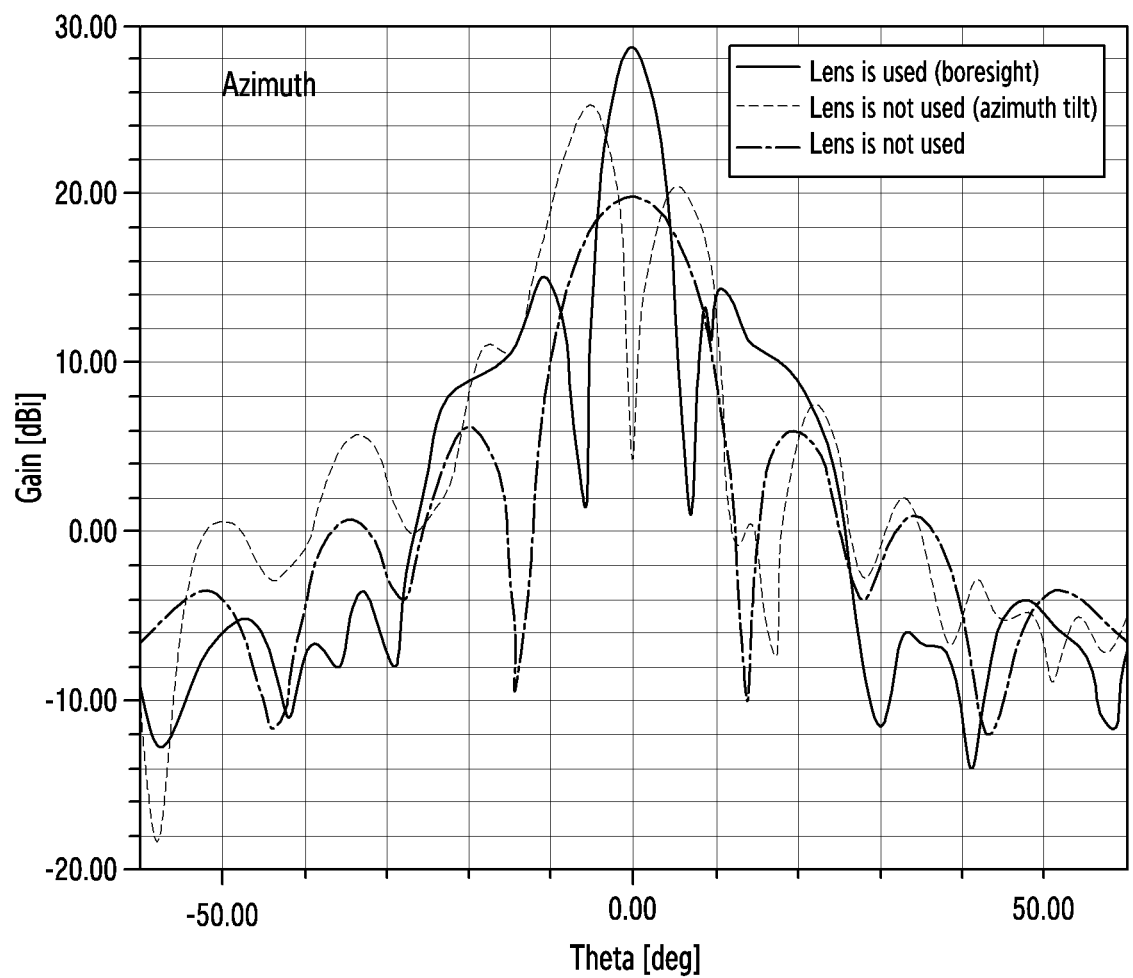
FIGS. 14A and 14B illustrate graphs indicating gains in an azimuth axis and gains in an elevation axis in a wireless communication system according to an embodiment of the disclosure.
Figure 14B:
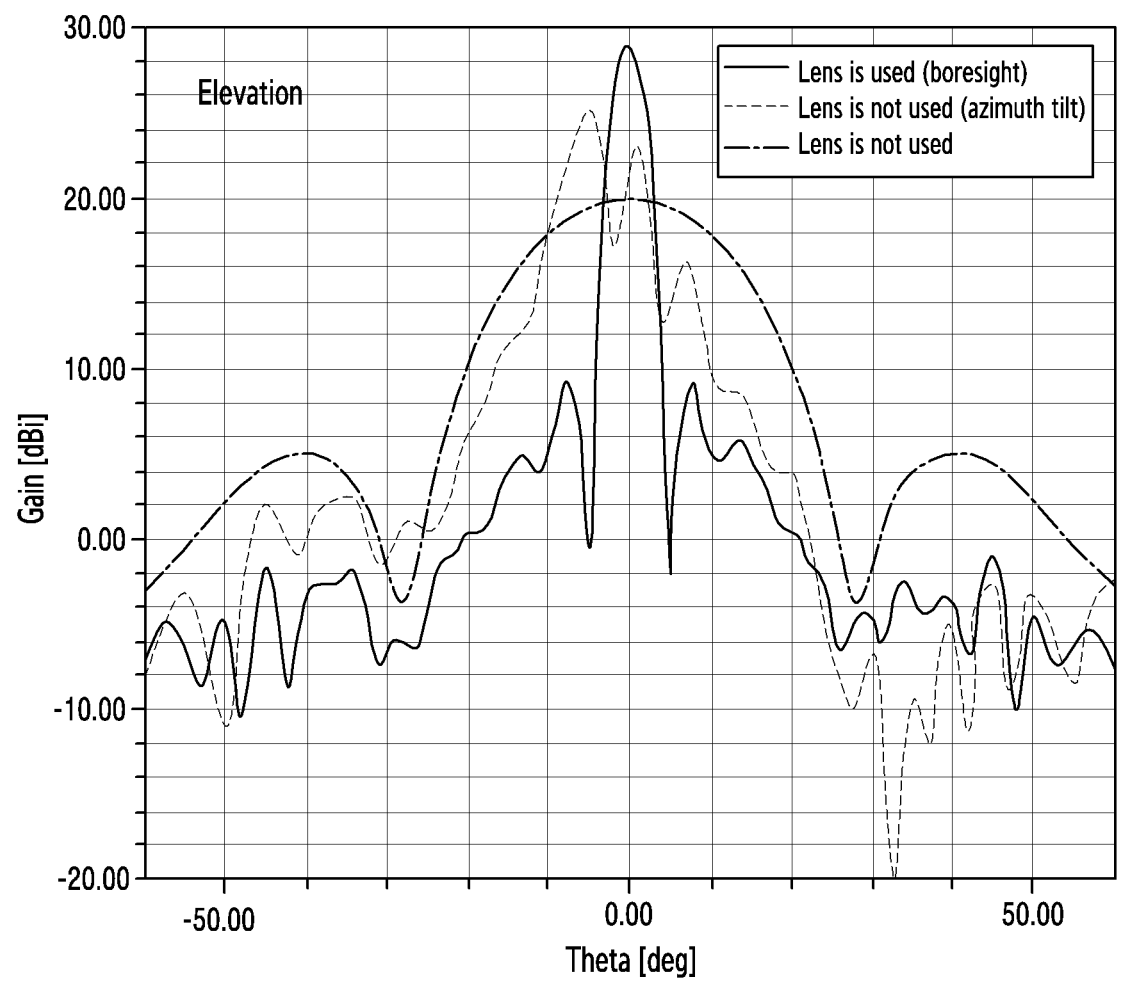

FIGS. 14A and 14B illustrate graphs indicating a gain in the azimuth axis and a gain in the elevation axis in a wireless communication system according to embodiments of the disclosure.

FIG. 14A is a graph for comparison of a gain according to the beam shapes illustrated in FIG. 13 with a gain when a lens is not used, and FIG. 14B is a graph for comparison of a gain according to the beam shapes illustrated in FIG. 13 with a gain when a lens is not used.

Referring to FIGS. 14A and 14B, it is identified that a highest gain is generated when a beam is formed in a boresight without tilting in both the azimuth axis and the elevation axis. When tilting is applied, it is identified that a high gain is generated compared to a case where a lens is not used.

As described above, by applying a phase value pattern to a signal emitted through an antenna array, a beam width may be increased or the signal may be tilted in the elevation axis or on the azimuth axis. As the beam width increases, characteristics of the lens should be defined in response thereto. For example, the characteristics of the lens according to various embodiments may be designed as shown in FIG. 15A and FIG. 15B below.

Figure 15A:
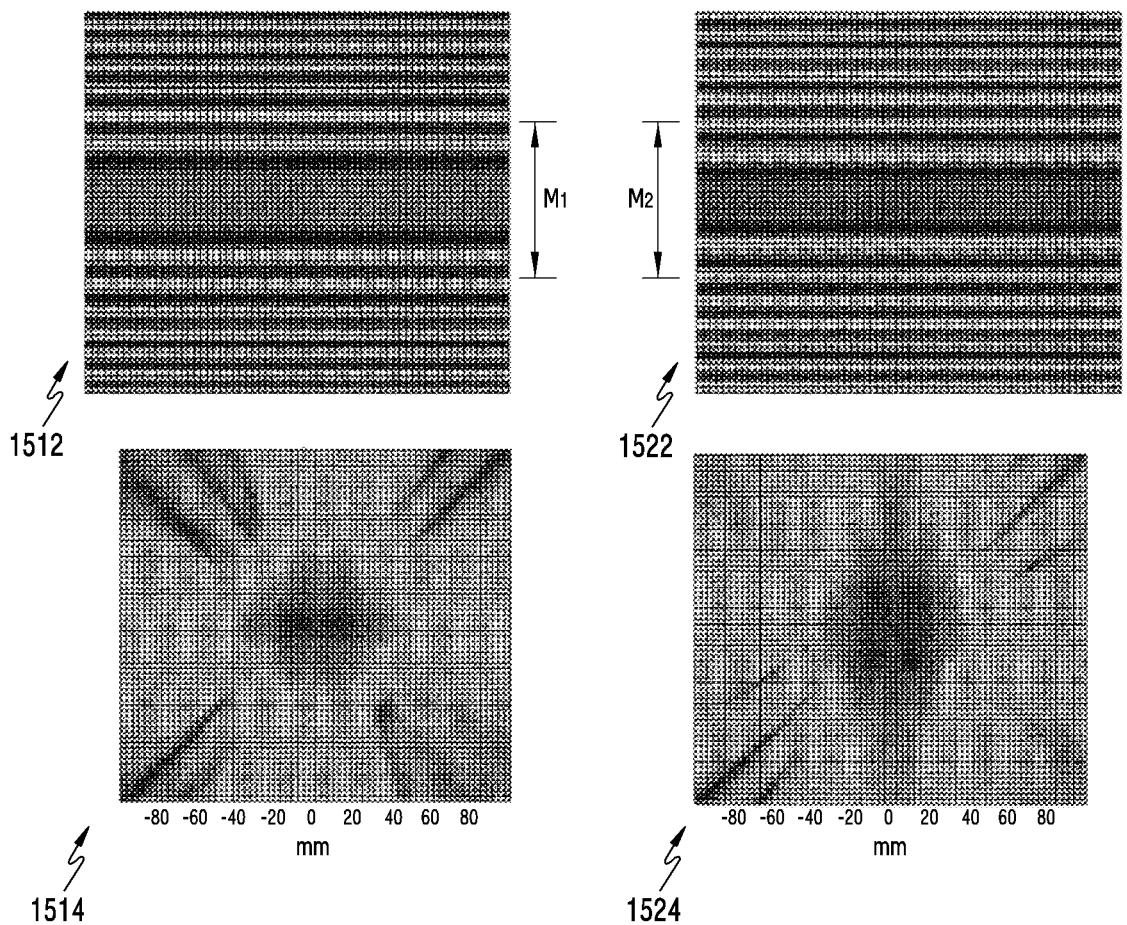
FIGS. 15A and 15B illustrate characteristics of lenses for a narrow beam and lenses for a wide beam in one-dimension and two-dimension in a wireless communication system according to embodiments of the disclosure.
Figure 15B:
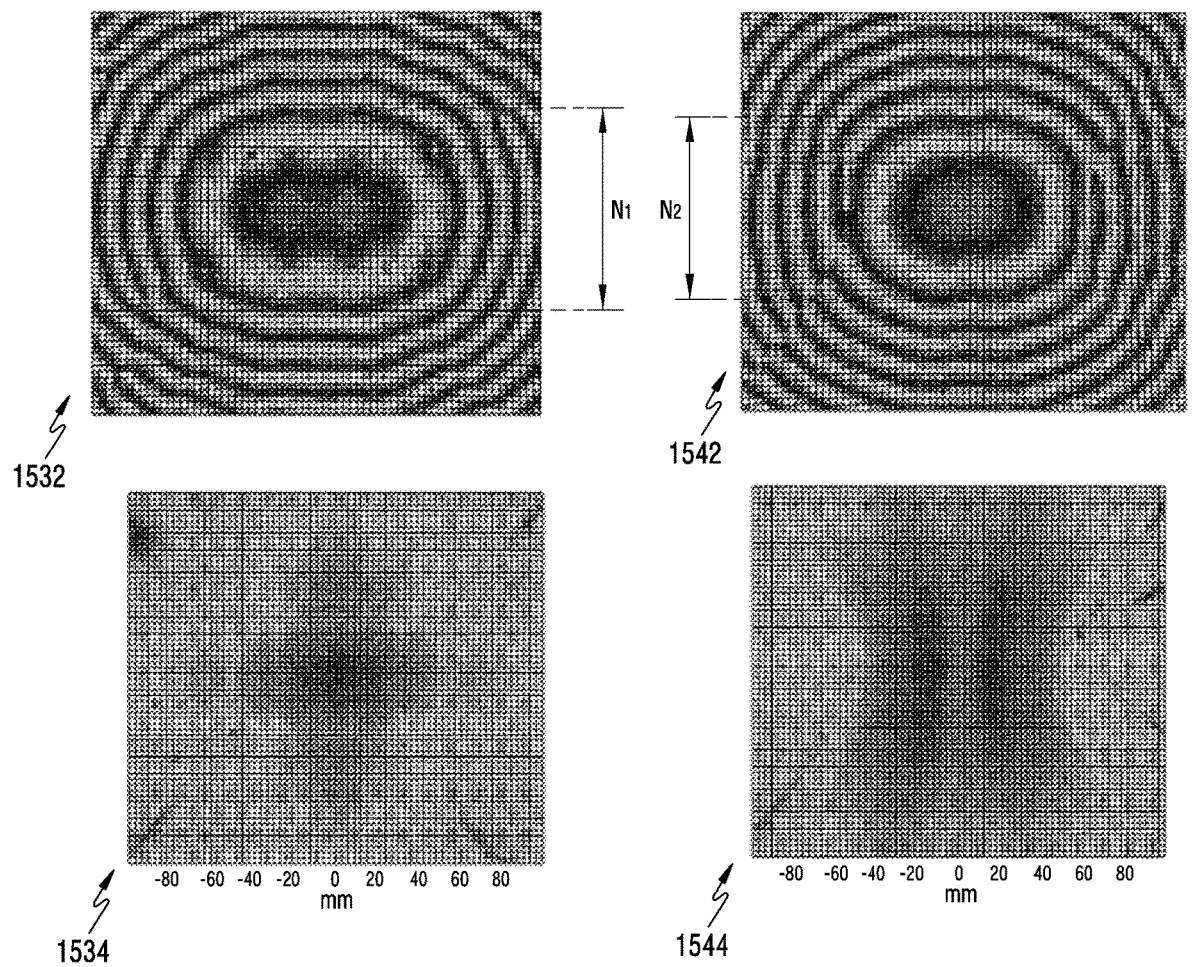

FIGS. 15A and 15B illustrate characteristics of a lens for a narrow beam and a lens for a wide beam in one-dimension and two-dimension in wireless communication systems according to embodiments of the disclosure.

FIG. 15A shows a lens characteristic when a beam width is increased in one dimension (e.g., the elevation axis).

Referring to FIG. 15A, a characteristic of a lens for a narrow beam is the same as shown in a phase mask 1512 and a signal magnitude distribution 1514, and a characteristic of a lens for a wide beam according to various embodiments is the same as shown in a phase mask 1522 and a signal magnitude distribution 1524. In FIG. 15A, $M_1$ and $M_2$ refer to intervals of unit cells showing a phase difference of 360° in phase masks 1512 and 1522, respectively. It is identified that $M_2$ corresponding to the lens for the wide beam is less than $M_1$ corresponding to the lens for the narrow beam. That is, when the wide beam is formed, a periodicity of a phase incident on the lens is reduced.

FIG. 15B shows a lens characteristic when a beam width is increased in two dimensions (e.g., the elevation axis and the azimuth axis).

Referring to FIG. 15B, a characteristic of a lens for a narrow beam is the same as shown in a phase mask 1532 and a signal magnitude distribution 1534, and a characteristic of a lens for a wide beam according to various embodiments is the same as shown in a phase mask 1542 and a signal magnitude distribution 1544. In FIG. 15B, $N_1$ and $N_2$ refer to intervals of unit cells showing a phase difference of 360° in phase masks 1532 and 1542, respectively. It is identified that $N_2$ corresponding to the lens for the wide beam is less than $N_1$ corresponding to the lens for the narrow beam. That is, when the wide beam is formed, a periodicity of a phase incident on the lens is reduced.

Figure 16:
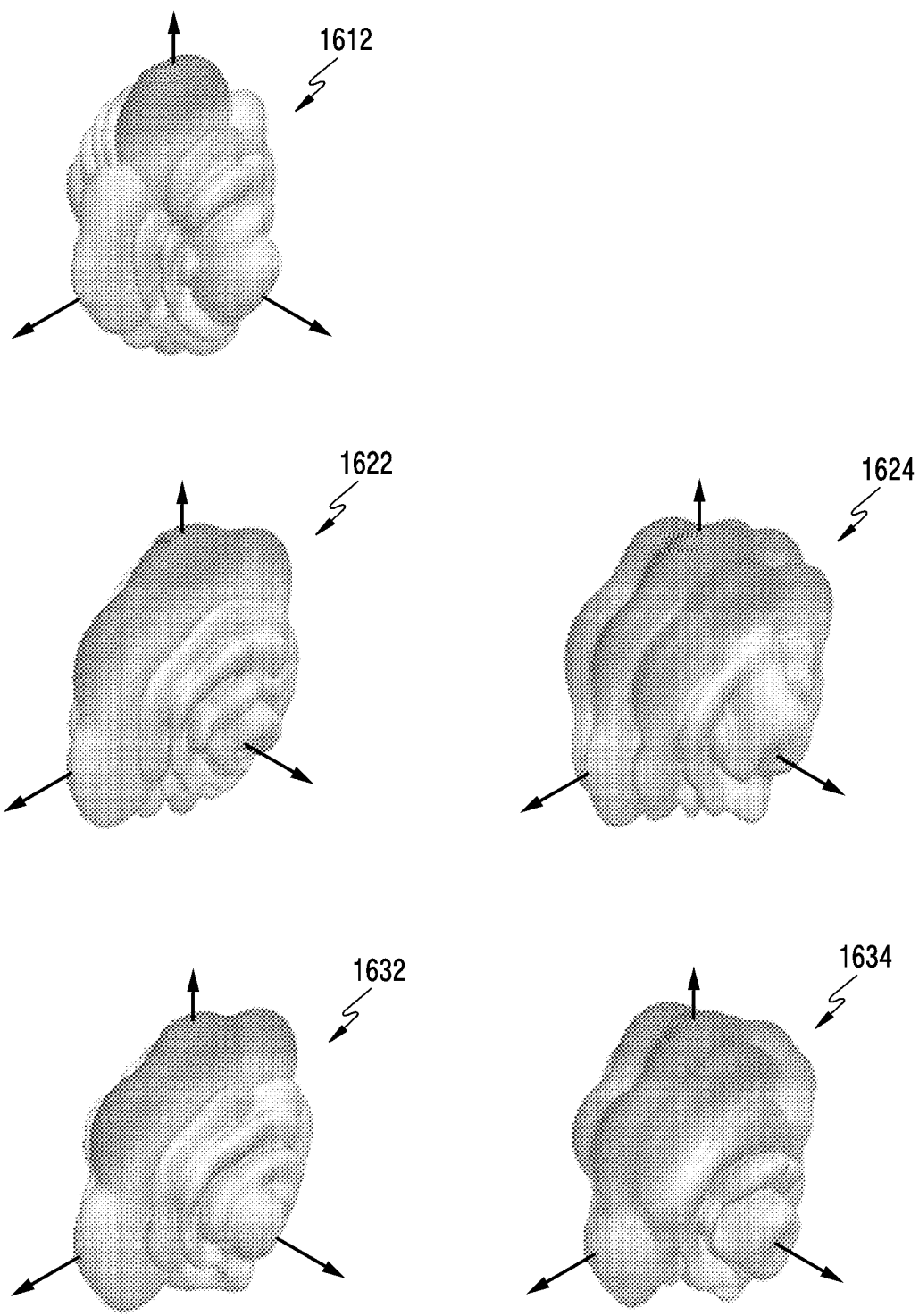
FIG. 16 illustrates examples of beam shapes based on different phase value patterns in a wireless communication system according to an embodiment of the disclosure.

FIG. 16 illustrates examples of beam shapes based on different phase value patterns in wireless communication systems according to embodiments of the disclosure. FIG. 16 illustrates beam shapes according to various phase value patterns. The beam shapes illustrated in FIG. 16 are examples of shapes of beams incident on a lens, that is, beams before passing through the lens.

Referring to FIG. 16, a beam shape 1612 corresponds to a narrow beam shape, and a phase value pattern used therefor is shown in Table 12 below.

TABLE 12

| Phase Value Pattern | 0 | 0 | 0 | 0 | 0 | 0 | 0 | 0 |
|---|---|---|---|---|---|---|---|---|
| | 0 | 0 | 0 | 0 | 0 | 0 | 0 | 0 |
| | 0 | 0 | 0 | 0 | 0 | 0 | 0 | 0 |
| | 0 | 0 | 0 | 0 | 0 | 0 | 0 | 0 |

A beam shape 1622 corresponds to a one-dimensional wide beam shape, and a phase value pattern used therefor is shown in Table 13 below.

TABLE 13

| Phase Value Pattern | 0 | 0 | 0 | 0 | 0 | 0 | 0 | 0 |
|---|---|---|---|---|---|---|---|---|
| | 90 | 90 | 90 | 90 | 90 | 90 | 90 | 90 |
| | 90 | 90 | 90 | 90 | 90 | 90 | 90 | 90 |
| | 0 | 0 | 0 | 0 | 0 | 0 | 0 | 0 |

A beam shape 1624 corresponds to a two-dimensional wide beam shape, and a phase value pattern used therefor is shown in Table 14 below.

TABLE 14

| Phase Value Pattern | 0 | 45 | 90 | 135 | 135 | 90 | 45 | 0 |
|---|---|---|---|---|---|---|---|---|
| | 90 | 135 | 180 | 225 | 225 | 180 | 135 | 90 |
| | 90 | 135 | 180 | 225 | 225 | 180 | 135 | 90 |
| | 0 | 45 | 90 | 135 | 135 | 90 | 45 | 0 |

A beam shape 1632 corresponds to a one-dimensional wide beam shape, and a phase value pattern used therefor is shown in Table 15 below.

TABLE 15

| Phase Value Pattern | 90 | 90 | 90 | 90 | 90 | 90 | 90 | 90 |
|---|---|---|---|---|---|---|---|---|
| | 0 | 0 | 0 | 0 | 0 | 0 | 0 | 0 |
| | 0 | 0 | 0 | 0 | 0 | 0 | 0 | 0 |
| | 90 | 90 | 90 | 90 | 90 | 90 | 90 | 90 |

A beam shape 1634 corresponds to a two-dimensional wide beam shape, and a phase value pattern used therefor is shown in Table 16 below.

TABLE 16

| Phase Value Pattern | 135 | 90 | 45 | 0 | 0 | 45 | 90 | 135 |
|---|---|---|---|---|---|---|---|---|
| | 225 | 180 | 135 | 90 | 90 | 135 | 180 | 225 |
| | 225 | 180 | 135 | 90 | 90 | 135 | 180 | 225 |
| | 135 | 90 | 45 | 0 | 0 | 45 | 90 | 135 |

The beam shape 1622 and the beam shape 1632 are both one-dimensional wide beams. However, the phase value pattern (e.g., Table 13) for the beam shape 1622 includes phase values that are decreased as moving towards the outer side from the center of the antenna array, while the phase value pattern (e.g., Table 15) for the beam shape 1632 includes phase values that are increased as moving towards the outer side from the center of the antenna array. Similarly, the beam shape 1624 and the beam shape 1634 are both two-dimensional wide beams. However, the phase value pattern (e.g., Table 14) for the beam shape 1624 includes phase values that are decreased as moving towards the outer side from the center of the antenna array, while the phase value pattern (e.g., Table 16) for the beam shape 1634 includes phase values that are increased as moving towards the outer side from the center of the antenna array.

As it has been identified based on the comparison in FIGS. 10B and 10C, a high gain may be provided in the case where the phase value pattern including phase values that are decreased as moving towards the outer side is used, compared to the case where the phase value pattern is not used. Therefore, as shown in Table 13 and Table 14, it is more advantageous for improving the gain to use the phase value pattern including the phase values that are decreased as moving from the center of the antenna array toward the outer side. That is, with respect to the center of the antenna array, it is preferable that a phase difference is larger than 0° and less than 180°. In other words, it is preferable that a difference between a phase applied to an antenna element closest to the center of the antenna array and a phase applied to another antenna element falls within a range of greater than 0° and less than 180°. Further, in order to widen a beam width, it is preferable that the number of rows or columns of the antenna array is four or more.

Figure 17A:
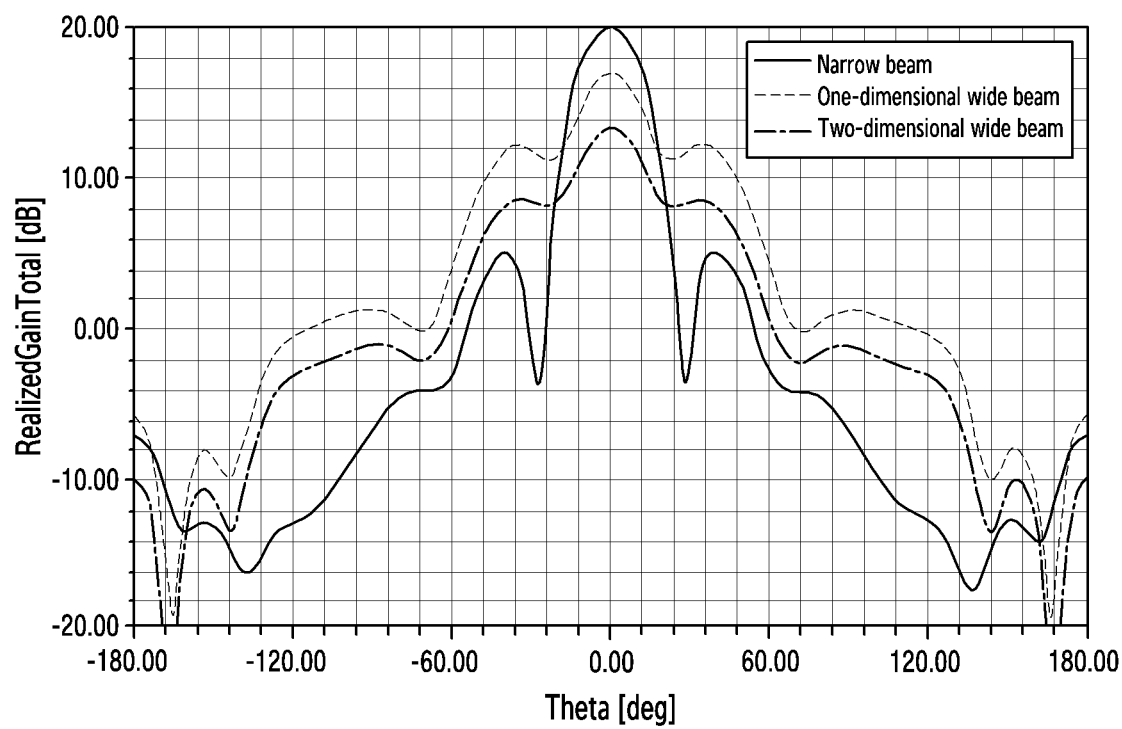
FIGS. 17A and 17B illustrate graphs indicating gains of a narrow beam, a one-dimensional wide beam, and a two-dimensional wide beam in a wireless communication system according to embodiments of the disclosure.
Figure 17B:
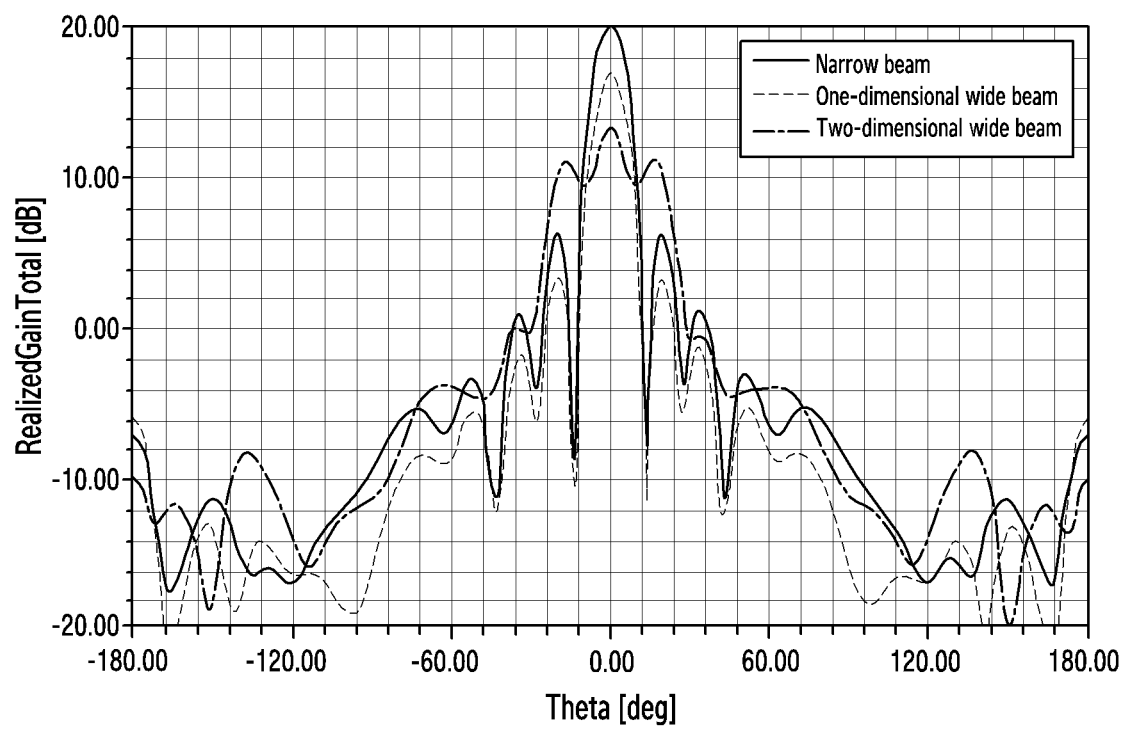

FIGS. 17A and 17B illustrate graphs indicating gains of a narrow beam, a one-dimensional wide beam, and a two-dimensional wide beam in wireless communication systems according to embodiments of the disclosure.

Referring to FIGS. 16, 17A and 17B, FIG. 17A shows a graph of gains of the beam shapes 1612, 1622 and 1624, and FIG. 17B shows a graph of gains of the beam shapes 1612, 1622 and 1624. The gains in FIGS. 17A and 17B are gains before passing through a lens. Therefore, it is identified that as a beam width becomes wider, a gain becomes lower. Thereafter, when each beam passes through the lens, an amount of gain variation that is improved due to a difference in an area of the illuminated field is changed. Therefore, it is preferable that the above described various embodiments are applied when an amount of gain variation, which is improved by an increase of an area of an illuminated field, is larger than an amount of gain variation decreased by widening a beam width.

These and related methods stated in the claims or specifications may be implemented in the form of hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type of optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A transmission device in a wireless communication system, the device comprising:
    a transmitter configured to form a beam by applying a phase value pattern to a signal transmitted through a planar antenna array, the phase value pattern being selected from a plurality of different phase value patterns;
    the antenna array configured to emit the beam; and
    a planar lens configured to adjust a gain of the beam emitted from the antenna array by using a phase mask corresponding to the phase value pattern,
    wherein the phase value pattern is defined to form the beam having a wider beam width than a case where the phase value pattern is not applied,
    wherein an area of an illuminated field, which is a physical area in which the beam emitted from the antenna array contacts the lens, depends on a distance between the antenna array and the lens,
    wherein the phase value pattern includes phase values that are decreased as moving towards an outer side from a center of the antenna array, in at least one column or at least one row of the antenna array, and
    wherein the beam emitted from the antenna array and passed through the lens comprises a narrower beam width than the beam emitted from the antenna array.

2. The transmission device of claim 1, wherein, in the phase value pattern, a difference between a first phase applied to an antenna element closest to the center of the antenna array and a second phase applied to another antenna element of the antenna array falls within a range between 0° and 180°.

3. The transmission device of claim 1, wherein the antenna array includes four or more rows or four or more columns, each of which has an antenna element.

4. The transmission device of claim 1, wherein the phase mask has a small phase periodicity compared to a phase mask of the lens for the case where the phase value pattern is not applied.

5. The transmission device of claim 1, wherein the phase value pattern is used as a default setting value applied to an element configured to adjust a phase within the transmitter.

6. The transmission device of claim 1, wherein the transmitter is configured to perform beamforming for assigning a directivity to the signal by using the phase value pattern and other phase and magnitude values.

7. The transmission device of claim 1, wherein the phase value pattern is determined based on the distance between the antenna array and the lens to control the gain.

8. The transmission device of claim 1, wherein the phase value pattern is used to control the area of the illuminated field on the lens.

9. The transmission device of claim 1, wherein the phase value pattern is a control factor separate from phase or magnitude values for beamforming in consideration of a channel.

10. A method for operating a transmission device in a wireless communication system, the method comprising:
    forming a beam by applying a phase value pattern to a signal transmitted through a planar antenna array, the phase value pattern being selected from a plurality of different phase value patterns; and
    emitting the signal through a planar lens having a phase mask corresponding to the phase value pattern,
    wherein the phase value pattern is defined to form the beam having a wider beam width than a case where the phase value pattern is not applied,
    wherein an area of an illuminated field, which is a physical area in which the beam emitted from the antenna array contacts the lens, depends on a distance between the antenna array and the lens,
    wherein the phase value pattern includes phase values that are decreased as moving towards an outer side from a center of the antenna array, in at least one column or at least one row of the antenna array, and
    wherein the beam emitted from the antenna array and passed through the lens comprises a narrower beam width than the beam emitted from the antenna array.

11. The method of claim 10, wherein, in the phase value pattern, a difference between a first phase applied to an antenna element closest to the center of the antenna array and a second phase applied to another antenna element of the antenna array falls within a range between 0° and 180°.

12. The method of claim 10, wherein the antenna array includes four or more rows or four or more columns, each of which has an antenna element.

13. The method of claim 10, wherein the phase mask has a small phase periodicity compared to a phase mask of the lens, which is for the case where the phase value pattern is not applied.

14. The method of claim 10, wherein the phase value pattern is used as a default setting value applied to an element configured to adjust a phase of the transmitted signal.

15. The method of claim 10, further comprising performing beamforming for assigning a directivity to the signal by using the phase value pattern and other phase and magnitude values.

16. The method of claim 10, further comprising determining the phase value pattern based on the distance between the antenna array and the lens to control the gain.

17. The method of claim 10, further comprising controlling the area of the illuminated field on the lens using the phase value pattern.

18. The method of claim 10, wherein the phase value pattern is a control factor separate from phase or magnitude values for beamforming in consideration of a channel.

* * * * *